US011585684B2

(12) United States Patent
Li

(10) Patent No.: US 11,585,684 B2
(45) Date of Patent: Feb. 21, 2023

(54) MULTICORE FIBER CROSSTALK SENSOR WITH MATCHED EFFECTIVE INDEX

(71) Applicant: CORNING INCORPORATED, Corning, NY (US)

(72) Inventor: Ming-Jun Li, Horseheads, NY (US)

(73) Assignee: Corning Incorporated, Corning, NY (US)

(*) Notice: Subject to any disclaimer, the term of this patent is extended or adjusted under 35 U.S.C. 154(b) by 244 days.

(21) Appl. No.: 16/999,147

(22) Filed: Aug. 21, 2020

(65) Prior Publication Data
US 2021/0063208 A1 Mar. 4, 2021

(51) Int. Cl.
G02B 6/02 (2006.01)
G01D 5/353 (2006.01)
G01K 11/3206 (2021.01)
G01L 1/24 (2006.01)

(52) U.S. Cl.
CPC ....... *G01D 5/3538* (2013.01); *G01K 11/3206* (2013.01); *G01L 1/242* (2013.01); *G02B 6/02042* (2013.01)

(58) Field of Classification Search
CPC .. G01D 5/3538; G01K 11/3206; G01K 11/32; G01L 1/242; G02B 6/02042; G02B 6/0281; G02B 6/03627; G02B 6/0365
See application file for complete search history.

(56) References Cited

U.S. PATENT DOCUMENTS

| 4,151,747 | A | 5/1979 | Gottlieb |
| 4,295,738 | A | 10/1981 | Meltz et al. |
| 9,574,911 | B2* | 2/2017 | Hoover ............... G01N 21/636 |
| 2014/0042306 | A1 | 2/2014 | Hoover et al. |

FOREIGN PATENT DOCUMENTS

EP 2806297 A1 11/2014

OTHER PUBLICATIONS

International Search Report and Written Opinion of the International Searching Authority; PCT/US2019/048132; dated Jul. 14, 2020; 17 Pages; European Property Office.
Taiji Sakamoto et al: "Experimental and numerical evaluation of inter-core differential mode delay characteristic of weakly-coupled multi-core fiber" Optics Express, vol. 22, No. 26, Dec. 18, 2014 (Dec. 18, 2014), pp. 31966-31976.

* cited by examiner

*Primary Examiner* — John Bedtelyon
(74) *Attorney, Agent, or Firm* — Kevin L. Bray

(57) ABSTRACT

An optical fiber sensor with high sensitivity and high spatial resolution is described. The optical fiber sensor includes a multicore fiber having cores configured to permit crosstalk between cores. Crosstalk corresponds to transfer of an optical signal from a core to another core and is used as a mechanism for sensing the external environment surrounding the multicore optical fiber. The degree of crosstalk depends on the relative refractive index profile of the cores and surrounding cladding, as well as on the spacing between cores. The external environment surrounding the multicore optical fiber and changes therein influence crosstalk between cores to permit sensing. The relative refractive index profiles of the cores are also configured to provide a group delay difference for optical signals propagating in different cores. The group delay difference facilitates the position of an external perturbation along the length of the multicore optical fiber.

28 Claims, 6 Drawing Sheets mentioned# MULTICORE FIBER CROSSTALK SENSOR WITH MATCHED EFFECTIVE INDEX

This application claims the benefit of priority to International Patent Application No. PCT/US2019/048132 filed on Aug. 26, 2019, the content of which is relied upon and incorporated herein by reference in its entirety.

FIELD OF THE DISCLOSURE

This disclosure pertains to optical fiber sensors. More particularly, this disclosure relates to multicore distributed optical fiber sensors. Most particularly, this disclosure relates to dual-core optical fibers exhibiting crosstalk between cores and sensors made therefrom.

BACKGROUND OF THE DISCLOSURE

Distributed optical fiber sensors (DOFSs) are attractive for many applications such as structural health monitoring for buildings, bridges, tunnels, dams and pipelines; temperature monitoring for the oil and gas industry; and perimeter intrusion monitoring for roads, borders, ports, military and government sites. Monitoring with a DOFS is normally based on a light scattering mechanism such as Rayleigh scattering, Brillouin scattering, or Raman scattering. Rayleigh scattering is a linear process, which is used to measure propagation effects, including attenuation and gain, phase interference and polarization variation. Brillouin scattering is a nonlinear process, which is dependent on temperature and strain. Raman scattering is another nonlinear process, which is dependent on the temperature of the fiber. Different DOFS systems based on each of the three scattering mechanisms have been studied extensively and commercial products are available. Deficiencies, however, remain for DOFSs based on each of the scattering mechanisms and there remains a need for new types of optical fiber sensors with improved sensitivity, spatial resolution, and sensing range.

SUMMARY

The present disclosure provides an optical fiber sensor with high sensitivity and high spatial resolution. The optical fiber sensor includes a multicore fiber having cores configured to permit transfer of an optical signal from one core to another core. The signal transfer corresponds to crosstalk between the cores and provides a mechanism for the transfer of an optical signal propagating in one core to another core. The degree of crosstalk depends on the relative refractive index profile of the cores and surrounding cladding, as well as on the spacing between cores. The external environment surrounding the multicore optical fiber influences crosstalk between cores. Crosstalk thus provides a mechanism for sensing the external environment and changes therein. The relative refractive index profiles of the cores are also configured to provide a group delay difference for optical signals propagating in different cores. The group delay difference permits determination of the location of the position of an external perturbation along the length of the multicore optical fiber. To improve sensitivity, the degree of crosstalk is increased by configuring the cores of the multicore optical fiber to have similar effective indices. Similar core effective indices lead to improved phase matching of the crosstalk signal with the launch signal, which in turn reduces signal loss during crosstalk.

The present description extends to:
A multicore optical fiber comprising:
a multicore glass fiber, the multicore glass fiber comprising:
a first core region surrounded by and directly adjacent to a first dedicated cladding region, the first core region having a first effective index;
a second core region surrounded by and directly adjacent to a second dedicated cladding region, the second core region having a second effective index; and
a third cladding region common to the first core and the second core, the third cladding region being directly adjacent to the first dedicated cladding region and the second dedicated cladding region;
wherein a degree of crosstalk between the first core region and the second core region is greater than −30 dB/km, a magnitude of a normalized group delay difference between the first core region and the second core region is greater than 1 ns/km, and a magnitude of a difference between the first effective index and the second effective index is less than $7.0 \times 10^{-4}$.

The present description extends to:
A multicore optical fiber comprising:
a multicore glass fiber, the multicore glass fiber comprising:
a first core region surrounded by and directly adjacent to a first dedicated cladding region, the first core region having a first effective index;
a second core region surrounded by and directly adjacent to a second dedicated cladding region, the second core region having a second effective index; and
a third cladding region common to the first core and the second core, the third cladding region being directly adjacent to the first dedicated cladding region and the second dedicated cladding region;
wherein a degree of crosstalk between the first core region and the second core region is greater than −20 dB/km and a magnitude of a difference between the first effective index and the second effective index is less than $7.0 \times 10^{-4}$.

The present description extends to:
A method of sensing comprising:
launching an optical signal into a first end of a first core region of a multicore optical fiber, the first core region having a first effective index; and
detecting a crosstalk signal from the optical signal at a second end of a second core region of the multicore optical fiber, the second core region having a second effective index, a magnitude of a difference between the first effective index and the second effective index less than $7.0 \times 10^{-4}$; and
determining a temperature or a change in temperature from the crosstalk signal.

The present description extends to:
A method of sensing comprising:
launching an optical signal into a first end of a first core region of a multicore optical fiber, the first core region having a first effective index; and
detecting a crosstalk signal from the optical signal at a second end of a second core region of the multicore optical fiber, the second core region having a second effective index, a magnitude of a difference between the first effective index and the second effective index less than $7.0 \times 10^{-4}$; and
determining a strain or a change in strain from the crosstalk signal.

The present description extends to:
A sensing system comprising:
a multicore optical fiber, the multicore optical fiber comprising:
a multicore glass fiber, the multicore glass fiber comprising:

a first core region surrounded by and directly adjacent to a first dedicated cladding region, the first core region having a first effective index;

a second core region surrounded by and directly adjacent to a second dedicated cladding region, the second core region having a second effective index; and a third cladding region common to the first core and the second core, the third cladding region being directly adjacent to the first dedicated cladding region and the second dedicated cladding region;

wherein a degree of crosstalk between the first core region and the second core region is greater than −30 dB/km, a magnitude of a normalized group delay difference between the first core region and the second core region is greater than 1 ns/km, and a magnitude of a difference between the first effective index and the second effective index is less than $7.0 \times 10^{-4}$; and a light source operably coupled to the first core region.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
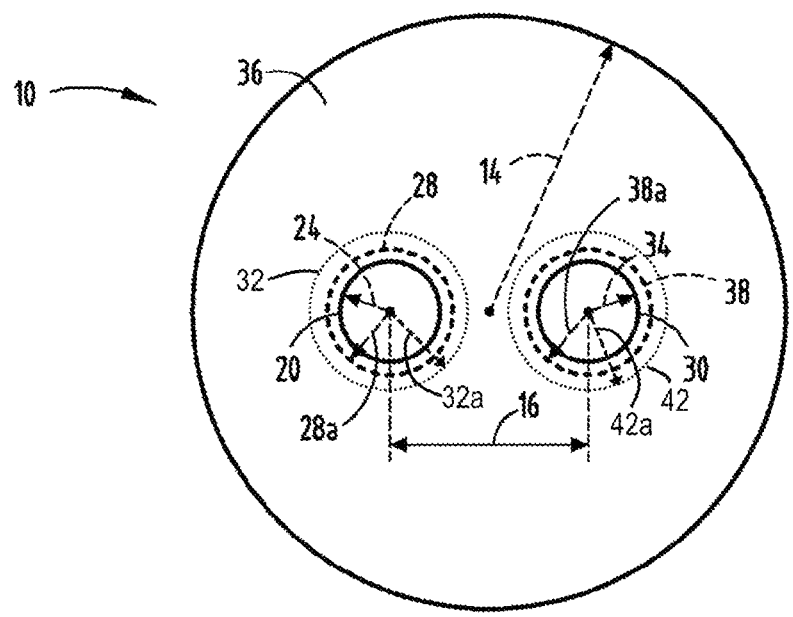
FIG. 1 depicts a cross-section of a multicore glass fiber having two core regions, each of which includes a dedicated inner cladding region and a dedicated depressed index cladding region.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims that follow, reference will be made to a number of terms which shall be defined to have the following meanings:

"Include," "includes," "including", or like terms means encompassing but not limited to, that is, inclusive and not exclusive.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is said to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

Directional terms as used herein—for example up, down, right, left, front, back, top, bottom—are made only with reference to the figures as drawn and the coordinate axis provided therewith and are not intended to imply absolute orientation.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but do touch an intervening material or series of intervening materials, where the intervening material or at least one of the series of intervening materials touches the other. Elements in contact may be rigidly or non-rigidly joined. Contacting refers to placing two elements in direct or indirect contact. Elements in direct (indirect) contact may be said to directly (indirectly) contact each other.

As used herein, "directly adjacent" means directly contacting and "indirectly adjacent" mean indirectly contacting. The term "adjacent" encompasses elements that are directly or indirectly adjacent to each other.

"Optical fiber" refers to a waveguide having a glass portion surrounded by a coating. The glass portion includes a core and a cladding, and is referred to herein as a "glass fiber". A multicore optical fiber is an optical fiber with a glass fiber that includes two or more cores surrounded by a cladding common to the two or more cores. The glass fiber functions as a waveguide.

"Radial position", "radius", or the radial coordinate "r" refers to radial position relative to the centerline (r=0) of a core of the multicore optical fiber. Each of the two or more cores of a multicore optical fiber has a centerline and a separate radial coordinate r. "Radial position", "radius", or the radial coordinate "R" refers to radial position relative to the centerline (R=0) of the multicore optical fiber. The multicore optical fiber has a single centerline.

"Refractive index" refers to the refractive index at a wavelength of 1550 nm.

The "refractive index profile" is the relationship between refractive index or relative refractive index and radius r. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position r within a core region and/or any of the cladding regions. When relative refractive index varies with radial position r in a particular region of the fiber (e.g. core region and/or any of the cladding regions described below), it is expressed in terms of its actual or approximate functional dependence, or in terms of its value at a particular radial position r within the region, or in terms of an average value applicable to the region as a whole. Unless otherwise specified, if the relative refractive index of a region (e.g. core region and/or any of the cladding regions) is expressed as a single value or as a parameter (e.g. $\Delta$ or $\Delta\%$) applicable to the region as a whole, it is understood that the relative refractive index in the region is constant, or approximately constant, and corresponds to the single value, or that the single value or parameter represents an average value of a non-constant relative refractive index dependence with radial position r in the region. For example, if i is a region of the glass fiber, the parameter $\Delta_i$ refers to the average value of relative refractive index in the region, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) as:

$$\Delta_i(r_i)\% = 100\frac{(n_i^2 - n_{ref}^2)}{2n_i^2} \quad (1)$$

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass. As used herein, the relative refractive index is represented by $\Delta$ (or "delta") or $\Delta\%$ (or "delta %") and its values are given in units of "%", unless otherwise specified. Relative refractive index may also be expressed as $\Delta(r)$ or $\Delta(r)$ %.

The average relative refractive index ($\Delta_{ave}$) of a region of the fiber is determined from Eq. (2):

$$\Delta_{ave} = \int_{r_{inner}}^{r_{outer}} \frac{\Delta(r)dr}{(r_{outer} - r_{inner})} \quad (2)$$

where $r_{inner}$ is the inner radius of the region, $r_{outer}$ is the outer radius of the region, and $\Delta(r)$ is the relative refractive index of the region.

The term "$\alpha$-profile" or "alpha profile" refers to a relative refractive index profile $\Delta(r)$ that has the functional form defined in Eq. (3):

$$\Delta(r) = \Delta(r_0)\left[1 - \left[\frac{|r - r_0|}{(r_z - r_0)}\right]^\alpha\right] \quad (3)$$

where $r_o$ is the radial position at which $\Delta(r)$ is maximum, $r_z > r_0$ is the radial position at which $\Delta(r)$ decreases to its minimum value, and r is in the range $r_i \le r \le r_f$, where $r_i$ is the initial radial position of the $\alpha$-profile, $r_f$ is the final radial position of the $\alpha$-profile, and $\alpha$ is a real number. An $\alpha$-profile with an $\alpha$ value of 10 or more is an example of a step-index profile. An $\alpha$-profile with an a value less than 10 is an example of a graded-index profile. $\Delta(r_0)$ for an $\alpha$-profile may be referred to herein as $\Delta_{max}$ or, when referring to a specific region i of the fiber, as $\Delta_{i,max}$. When the relative refractive index profile of the fiber core region is described by an $\alpha$-profile with $r_0$ occurring at the centerline (r=0) and $r_z$ corresponding to the outer radius $r_1$ of the core region, Eq. (3) simplifies to Eq. (4):

$$\Delta_1(r) = \Delta_{1max}\left[1 - \left[\frac{r}{r_1}\right]^\alpha\right] \quad (4)$$

The "mode field diameter" or "MFD" of an optical fiber is defined in Eq. (5) as:

$$MFD = 2w \quad (5)$$

$$w^2 = 2\frac{\int_0^\infty (f(r))^2 rdr}{\int_0^\infty \left(\frac{df(r)}{dr}\right)^2 rdr}$$

where f(r) is the transverse component of the electric field distribution of the guided optical signal and r is radial position in the fiber. "Mode field diameter" or "MFD" depends on the wavelength of the optical signal and is reported herein for a wavelength of 1550 nm. Specific indication of the wavelength will be made when referring to mode field diameter herein. Unless otherwise specified, mode field diameter refers to the $LP_{01}$ mode at the specified wavelength.

"Effective area" of an optical fiber is defined as:

$$A_{eff} = \frac{2\pi \left[ \int_0^\infty (f(r))^2 r dr \right]^2}{\int_0^\infty (f(r))^4 r dr}$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

The "effective index" $n_{eff}$ of an optical fiber is the ratio of the propagation constant β of a guided mode with wavelength λ in the optical fiber to the propagation constant $β_0$ of light with wavelength λ in vacuum:

$$n_{eff} = \frac{\beta}{\beta_0}$$

where $$\beta_0 = \frac{2\pi}{\lambda}$$

The propagation constant β corresponds to the change in phase of the guided mode per unit length in the fiber and $β_0$ corresponds to the change in phase per unit length of the light in vacuum. The effective index is reported herein at a wavelength of 1550 nm, a wavelength at which the optical fibers described herein are single-mode fibers.

The effective index is related to the phase velocity of a guided mode in an optical fiber. When two cores have the same effective index, they have the same phase velocity and the two cores are at the phase-matched condition. At the phase-matched condition, crosstalk between the cores is maximized because phase matching of the light coupled from one core to the other core leads to constructive interference of the optical signals in the two cores during coupling. If the two cores differ in effective index, destructive interference of the optical signals in the two cores occurs during coupling and crosstalk is reduced. The reduction in crosstalk increases as the difference between the effective indices of the two cores increases. Accordingly, as disclosed herein, it is preferable to maintain a small difference between the effective indices of coupled cores involved in signal crosstalk.

Reference to a difference between a first quantity and a second quantity means the result obtained by subtracting the second quantity from the first quantity. For example, a difference between a first effective index and a second effective index means the result obtained by subtracting the second effective index from the first effective index and a difference between a radius $r_i$ and a radius $r_j$ refers to $r_i - r_j$. Reference to a magnitude of a quantity or a magnitude of a difference refers to the absolute value of the quantity or the difference.

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. Cutoff wavelength will be reported herein as a fiber cutoff wavelength or a cable cutoff wavelength. The fiber cutoff wavelength is based on a 2-meter fiber length and the cable cutoff wavelength is based on a 22-meter cabled fiber length. Each core of a multicore optical fibers exhibits a cutoff wavelength. The cutoff wavelength may be the same or different for different cores.

"Chromatic dispersion", herein referred to as "dispersion" unless otherwise noted, of an optical fiber is the sum of the material dispersion and the waveguide dispersion. The zero-dispersion wavelength ($λ_0$) is the wavelength at which the dispersion has a value of zero. Dispersion slope is the rate of change of dispersion with respect to wavelength. Dispersion and dispersion slope are reported herein at a wavelength of 1550 nm and are expressed in units of ps/nm·km and ps/nm$^2$·km, respectively. Each core of a multicore optical fibers exhibits dispersion. The dispersion may be the same or different for different cores.

The multicore optical fibers disclosed herein include two or more core regions and a cladding region common to at least two of the two or more core regions. The multicore optical fibers preferably further include a coating surrounding the cladding region. The core regions and cladding region are glass. The cladding region is a single homogeneous region or multiple regions that differ in relative refractive index. In embodiments with multiple cladding regions, a cladding region is said to be "dedicated" if it surrounds only one of the two or more cores and is said to be "common" if it surrounds at least two of the two or more cores. In embodiments with multiple cladding regions, at least one of the cladding regions is common to two or more cores of the multicore fiber. In embodiments with a single cladding region, the single cladding region is common to two or more cores of the multicore fiber. Preferably, at least one of multiple cladding regions, or a single cladding region, is common to all cores of the multicore optical fiber.

In some embodiments, the cladding region includes an inner cladding region and an outer cladding region that differ in relative refractive index. The relative refractive index of the inner cladding region may be less than the relative refractive index of the outer cladding region. In one embodiment, the outer cladding region is common to all cores of the multicore optical fiber and each of the two or more cores is surrounded by a dedicated inner cladding region, where each dedicated inner cladding region is directly adjacent a core and the outer cladding is directly adjacent each of the dedicated inner cladding regions.

In some embodiments, the cladding region includes a depressed index cladding region between an inner cladding region and an outer cladding region. The depressed index cladding region is a cladding region having a lower relative refractive index than the inner cladding region and the outer cladding region. The depressed index cladding region is preferably directly adjacent to both the inner cladding region and outer cladding region. In one embodiment, each of the two or more cores has a dedicated inner cladding region, a dedicated depressed index cladding region surrounding and directly adjacent to the dedicated inner cladding region, and a common outer cladding region surrounding and directly adjacent to each of the dedicated depressed index cladding regions. The depressed index cladding region may contribute to a reduction in bending losses. The core region, inner cladding region, depressed index cladding region, and outer cladding region are also referred to herein as core, cladding, inner cladding, depressed index cladding, and outer cladding, respectively.

Whenever used herein, radial position $r_1$ and relative refractive index $\Delta_1$ or $\Delta_1(r)$ refer to a core region, radial position $r_2$ and relative refractive index $\Delta_2$ or $\Delta_2(r)$ refer to a dedicated inner cladding region, radial position $r_3$ and relative refractive index $\Delta_3$ or $\Delta_3(r)$ refer to a dedicated depressed index cladding region, radial position $r_4$ and relative refractive index $\Delta_{4doc}$ or $\Delta_{4doc}(r)$ refer to a dedicated outer cladding region, radial position $R_4$ and relative refractive index $\Delta_4$ or $\Delta_4(R)$ refer to a common outer cladding region, radial position $R_5$ refers to a primary coating, and radial position $R_6$ refers to a secondary coating. Each radial position $r_i$ (i=1, 2, 3, or 4) and $R_i$ (i=4, 5, or 6) refers to the outer radius of the region associated with the value i. For example, $r_1$ refers to the outer radius of a core region, $r_2$ refers to the outer radius of a dedicated inner cladding region etc.

When helpful for purposes of clarity to identify radial positions and relative refractive indices of different core regions, different dedicated inner cladding regions, different dedicated and/or depressed index cladding regions of the multicore glass fiber, a second identifying subscript will be used. For example, the radius $r_{i,j}$ refers to the radial position $r_i$ of the $j^{th}$ region of type i in the multicore glass fiber and $\Delta_{i,j}$ refers to the relative refractive index $\Delta_i$ of the $j^{th}$ region of type i in the multicore glass fiber. Regions of type i include a core region (i=1), an inner cladding region (i=2), a depressed index cladding region (i=3) and an outer cladding region (i=4). For purposes of illustration, the radial positions $r_{1,1}$ and $r_{1,2}$ refer to the outer radius $r_1$(i=1) of a first core region (j=1) and the outer radius $r_1$(i=1) of a second core region (j=2) of a multicore glass fiber, respectively. Similarly, the relative refractive indices $\Delta_{1,1}$ and $\Delta_{1,2}$ refer to the relative refractive index $\Delta_1$ (i=1) of a first core region (j=1) and the relative refractive index $\Delta_1$(i=1) of a second core region (j=2) of a multicore glass fiber, respectively. When a symbol designating a radial position or relative refractive index includes a single subscript, it is understood that the symbol and subscript refer to any of the regions of type i in the multicore glass fiber, where it is further understood that the numerical value associated with the symbol and subscript may be the same or different for the different regions of type i in the multicore glass fiber. For example, the radial position $r_1$ refers to the outer radius of any of the core regions of the multicore glass fiber, where it is understood that the numerical value of the outer radius $r_1$ may be the same or different for the different core regions in the multicore glass fiber.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_{4min}$. In embodiments in which the relative refractive index is constant or approximately constant over a region (e.g. a step-index profile), the maximum and minimum values of the relative refractive index are equal or approximately equal. Unless otherwise specified, if a single value is reported for the relative refractive index of a region, the single value corresponds to an average value for the region. For core regions with an α-profile or graded-index relative refractive index profile, $\Delta_{1max}$ corresponds to the value of $\Delta_1$ at the centerline (r=0) of the core region.

It is understood that a core region is substantially cylindrical in shape and that a dedicated inner cladding region, a dedicated depressed index cladding region, a dedicated outer cladding region, a primary coating, and a secondary coating are substantially annular in shape. Cladding regions common to two or more cores have shapes with internal cavities sized to accommodate the two or more cores and any dedicated cladding regions accompanying the two or more cores. Annular regions are characterized in terms of an inner radius and an outer radius. Radial positions $r_1$, $r_2$, and $r_3$, refer herein to the outermost radii of core region, dedicated inner cladding region, and dedicated depressed index cladding region, respectively. In embodiments having an outer cladding common to all cores, the glass fiber of the multicore optical fiber is preferably substantially cylindrical in shape and $R_4$ refers to the outer radius of the common outer cladding. The radius $R_4$ thus corresponds to the outer radius of the glass fiber of the multicore optical fiber. In some embodiments, the glass fiber is surrounded by a primary coating and a secondary coating, each of which is substantially annular in shape. The radius $R_5$ refers to the outer radius of the primary coating and the radius $R_6$ refers to the outer radius of the secondary coating.

When two dedicated cladding regions are directly adjacent to each other, the outer radius of the inner of the two dedicated cladding regions coincides with the inner radius of the outer of the two dedicated cladding regions. In one embodiment, for example, the glass fiber includes a core with a dedicated inner cladding region surrounded by and directly adjacent to a dedicated depressed index cladding region. In such an embodiment, the radius $r_2$ corresponds to the outer radius of the dedicated inner cladding region and the inner radius of the dedicated depressed index cladding region. In embodiments in which the relative refractive index profile includes a dedicated inner cladding region directly adjacent to the core, the radial position $r_1$ corresponds to the outer radius of the core and the inner radius of the dedicated inner cladding region.

The following terminology applies to embodiments in which the relative refractive index profile includes a dedicated inner cladding region surrounding and directly adjacent to a core region, and a dedicated depressed index cladding region surrounding and directly adjacent to the dedicated inner cladding region. The difference between radial position $r_2$ and radial position $r_1$ is referred to herein as the thickness of the dedicated inner cladding region. The difference between radial position $r_3$ and radial position $r_2$ is referred to herein as the thickness of the dedicated depressed index cladding region.

In embodiments with a primary coating surrounding and directly adjacent to a common outer cladding region, and a secondary coating surrounding and directly adjacent the primary coating, the difference between radial position $R_5$ and radial position $R_4$ is referred to herein as the thickness of the primary coating and the difference between radial position $R_6$ and radial position $R_5$ is referred to herein as the thickness of the secondary coating.

As will be described further hereinbelow, the relative refractive indices of the core region, inner cladding region, depressed index cladding region, and outer cladding region may differ. The relative refractive index of the core region is higher than the relative refractive index of any of the cladding regions. In embodiments that include an outer cladding region and an inner cladding region, the relative refractive index of the inner cladding region may be greater than, less than or equal to the relative refractive index of the outer cladding region. In embodiments that include an inner cladding region, a depressed index cladding region, and an outer cladding region, the relative refractive index of the depressed index cladding region is less than the relative refractive index of the inner cladding region and the relative refractive index of the outer cladding region. Any or all of the relative refractive indices, radial positions, and thicknesses of the core region, dedicated inner cladding region, and dedicated depressed index cladding region for different cores of the multicore optical fiber may be the same or different. In different embodiments, all cores of the multicore optical fiber have step-index profiles, all cores of the multicore optical fiber have graded-index profiles, or some cores of the multicore optical fiber have step-index profiles and other cores of the multicore optical fiber have graded-index profiles.

Each of the regions may be formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is silica glass. When the undoped glass is silica glass, updopants include Cl, Br, Ge, Al, P, Ti, Zr, Nb, and Ta, and downdopants include F and B. Regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different regions.

The term "mode" refers to guided mode. A single-mode fiber is an optical fiber designed to support only the fundamental LP01 modes over a substantial length of the optical fiber (e.g., at least several meters), but that under certain circumstances can support multiple modes over short distances (e.g., tens of centimeters). We assume that the birefringence of the fiber is sufficiently low to assume that the two orthogonally polarized components of the LP01 mode are degenerate and propagate with the same phase velocity. A multimode optical fiber is an optical fiber designed to support the fundamental LP01 mode and at least one higher-order $LP_{nm}$ mode over a substantial length of the optical fiber, where either $n \neq 0$ or $n \neq 1$.

The present disclosure provides multicore glass fibers and multicore optical fibers as well as ribbons and cables containing multicore glass fibers and multicore optical fibers. In a ribbon, the multicore glass fibers or multicore optical fibers are aligned relative to one another in a substantially planar and parallel relationship. The multicore glass fibers or multicore optical fibers in ribbons are encapsulated by a ribbon matrix in any of several known configurations (e.g., edge-bonded ribbon, thin-encapsulated ribbon, thick-encapsulated ribbon, or multi-layer ribbon) by conventional methods of making fiber optic ribbons. The ribbon contains two or more multicore glass fibers or multicore optical fibers. In some embodiments, the ribbon contains four or more, or eight or more, or twelve or more, or sixteen or more multicore glass fibers or multicore optical fibers. The ribbon matrix has tensile properties similar to the tensile properties of a secondary coating and is formed from the same, similar, or different composition used to prepare a secondary coating. A cable includes a plurality of multicore glass fibers or multicore optical fibers surrounded by a jacket. The jacket typically has a circular cross-section and is flexible or rigid depending on the application requirement. Multicore glass fibers or multicore optical fibers are densely or loosely packed into a conduit enclosed by an inner surface of the jacket. The number of fibers placed in the jacket is referred to as the "fiber count" of cable. The jacket is formed from an extruded polymer material and may include multiple concentric layers of polymers or other materials. The cable may also include one or more strengthening members embedded within the jacket or placed within the conduit defined by the inner surface of the jacket. Strengthening members include fibers or rods that are more rigid than the jacket. The strengthening member is made from metal, braided steel, glass-reinforced plastic, fiber glass, or other suitable material. The cable may include other layers surrounded by the jacket (e.g. armor layers, moisture barrier layers, rip cords, etc.). The cable may have a stranded, loose tube core or other fiber optic cable construction.

For purposes of illustration, the disclosure that follows describes multicore glass fibers having two cores. It should be apparent, however, that multicore glass fibers having more than two cores are similarly contemplated and within the scope of the disclosure. Particular characteristics of the arrangement of cores that enable crosstalk between cores are also described. These characteristics apply similarly to any pair of cores in multicore glass fibers having more than two cores. Although the disclosure emphasizes multicore glass fibers, it is further understood that one or more polymer coatings may be applied to the outer surface of the multicore glass fiber. Polymer coatings include primary coatings, secondary coatings, ink layers, and matrix materials known in the art.

One example of a relative refractive index profile is a step-index relative refractive index profile, which has a core region whose refractive index is constant or approximately constant with distance from the centerline of the core. One example of a step-index fiber is a fiber with a core region having a relative refractive index profile with an α-profile with a value of α greater than or equal to 10 as described above. Another example of a relative refractive index profile is a graded-index profile, which has a core region whose refractive index varies with distance from the centerline of the core. One example of a graded-index fiber is a fiber with a core region having a relative refractive index profile with an α-profile with a value of α less than 10 as described above.

FIG. 1 illustrates a multicore glass fiber with two cores. In each core, a core region is directly adjacent to a dedicated inner cladding region, which is directly adjacent to a dedicated depressed index cladding region, which is directly adjacent to a common outer cladding region. A first core includes core region 20, dedicated inner cladding 28, dedicated depressed index cladding 32, and common outer cladding 36. Core region 20 has an outer radius $r_1$ depicted at 24. Dedicated inner cladding 28 has an inner radius depicted at 24 and an outer radius $r_2$ depicted at 28a. Dedicated depressed index cladding region 32 has an inner radius depicted at 28a and an outer radius $r_3$ depicted at 32a. A second core includes core region 30, dedicated inner cladding 38, dedicated depressed index cladding 42, and common outer cladding 36. Core region 30 has an outer radius $r_1$ depicted at 34. Dedicated inner cladding 38 has an inner radius depicted at 34 and an outer radius $r_2$ depicted at 38a. Dedicated depressed index cladding region 42 has an inner radius depicted at 38a and an outer radius $r_3$ depicted at 42a. Common outer cladding region 36 has a radius $R_4$ depicted at 14 and the spacing between the centerlines of core regions 20 and 30 is depicted at 16.

Figure 2:
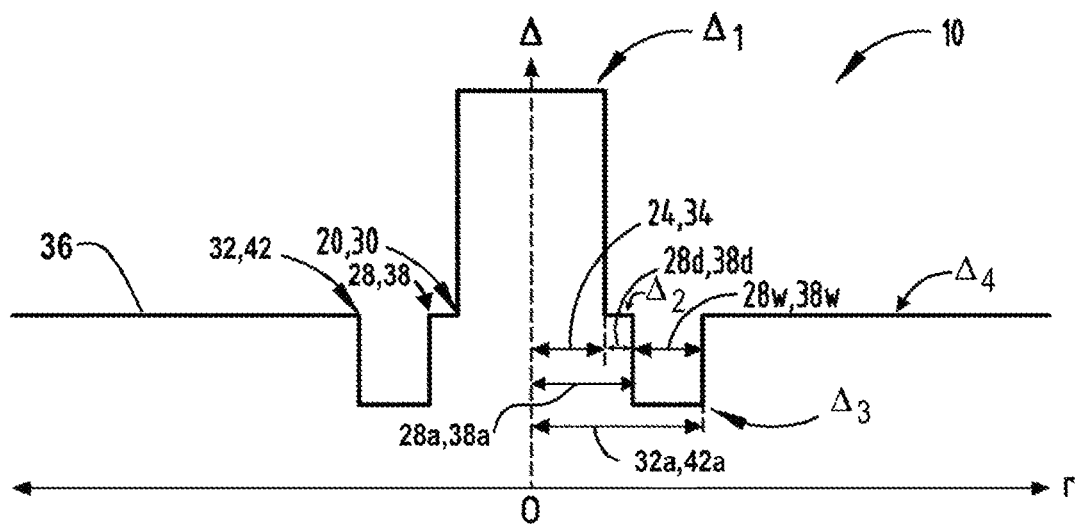
FIG. 2 depicts an exemplary step-index profile for a core in the multicore glass fiber shown in FIG. 1.

FIG. 2 depicts a relative refractive index profile for cores of a multicore glass fiber having a dedicated inner cladding region, a dedicated depressed index cladding region, and a common outer cladding region as shown, for example, in FIG. 1. Relative refractive index profile 10 depicts core regions 20 and 30 with radius $r_1$ depicted at 24 and 34, dedicated inner cladding regions 28 and 38 with radius $r_2$ depicted at 28a and 38a and thickness depicted at 28d and 38d, dedicated depressed index cladding regions 32 and 42 with radius $r_3$ depicted at 32a and 42a and thickness depicted at 28w and 38w. $\Delta_1$, $\Delta_2$, $\Delta_3$, and $\Delta_4$ are also shown. Core regions 20 and 30 each have a step-index relative refractive index profile.

Figure 3:
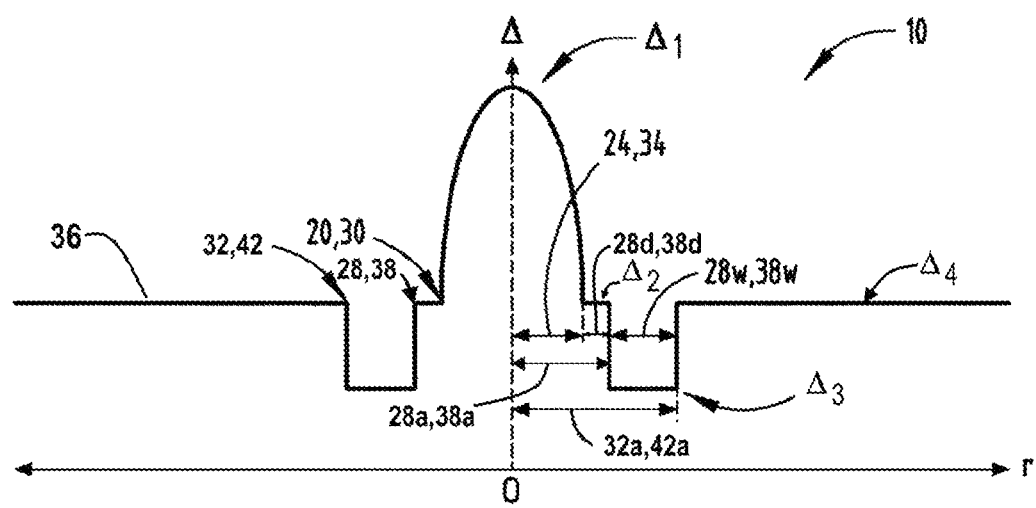
FIG. 3 depicts an exemplary α-profile for a core in the multicore glass fiber shown in FIG. 1.

FIG. 3 depicts a relative refractive index profile for cores of a multicore glass fiber having a dedicated inner cladding region, a dedicated depressed index cladding region, and a common outer cladding region as shown, for example, in FIG. 1. Relative refractive index profile 10 depicts core regions 20 and 30 with radius $r_1$ depicted at 24 and 34, dedicated inner cladding regions 28 and 38 with radius $r_2$ depicted at 28a and 38a and thickness depicted at 28d and 38d, dedicated depressed index cladding regions 32 and 42 with radius $r_3$ depicted at 32a and 42a and thickness depicted at 28w and 38w. $\Delta_1$, $\Delta_2$, $\Delta_3$, and $\Delta_4$ are also shown. Core regions 20 and 30 each have a graded-index relative refractive index profile.

Figure 4:
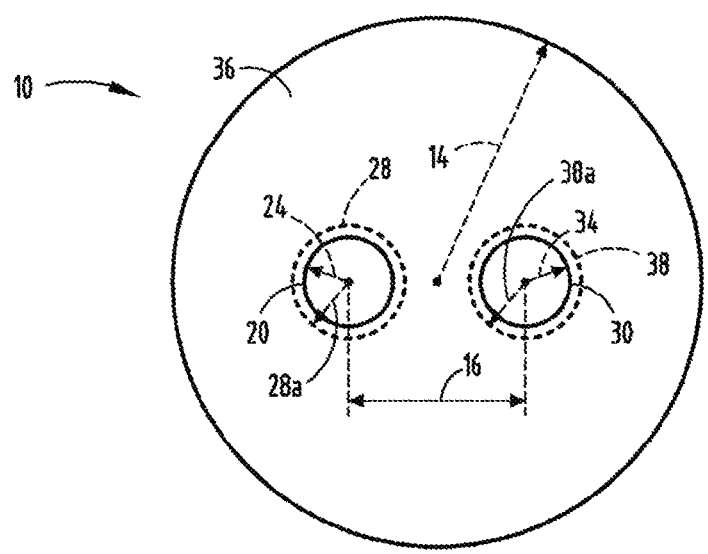
FIG. 4 depicts a cross-section of a multicore glass fiber having two core regions, each of which has a dedicated inner cladding region.

FIG. 4 illustrates a multicore glass fiber with two cores. In each core, a core region is directly adjacent to a dedicated inner cladding region, which is directly adjacent to a common outer cladding region. A first core includes core region 20, dedicated inner cladding 28 and common outer cladding 36. Core region 20 has an outer radius $r_1$ depicted at 24. Dedicated inner cladding 28 has an inner radius depicted at 24 and an outer radius $r_2$ depicted at 28a. A second core includes core region 30, dedicated inner cladding 38 and common outer cladding 36. Core region 30 has an outer radius $r_1$ depicted at 34. Dedicated inner cladding 38 has an inner radius depicted at 34 and an outer radius $r_2$ depicted at 38a. Common outer cladding region 36 has a radius $R_4$ depicted at 14 and the spacing between the centerlines of core regions 20 and 30 is depicted at 16.

Figure 5:
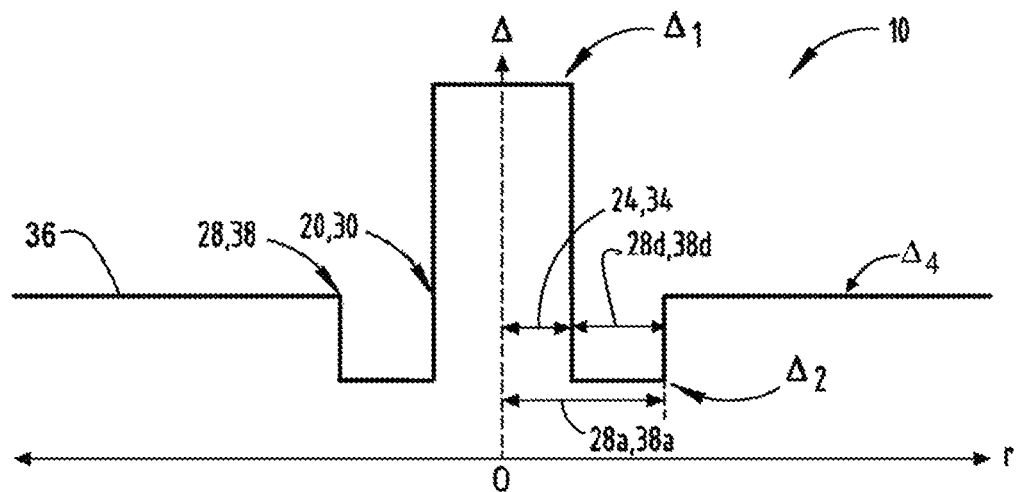
FIG. 5 depicts an exemplary step-index profile for a core in the multicore glass fiber shown in FIG. 4.

FIG. 5 depicts a relative refractive index profile for cores of a multicore glass fiber having a dedicated inner cladding region and a common outer cladding region as shown, for example, in FIG. 4. Relative refractive index profile 10 depicts core regions 20 and 30 with radius $r_1$ depicted at 24 and 34, dedicated inner cladding regions 28 and 38 with radius $r_2$ depicted at 28a and 38a and thickness depicted at 28d and 38d, and common outer cladding region 36. $\Delta_1$, $\Delta_2$, and $\Delta_4$ are also shown. Core regions 20 and 30 each have a step-index relative refractive index profile.

Figure 6:
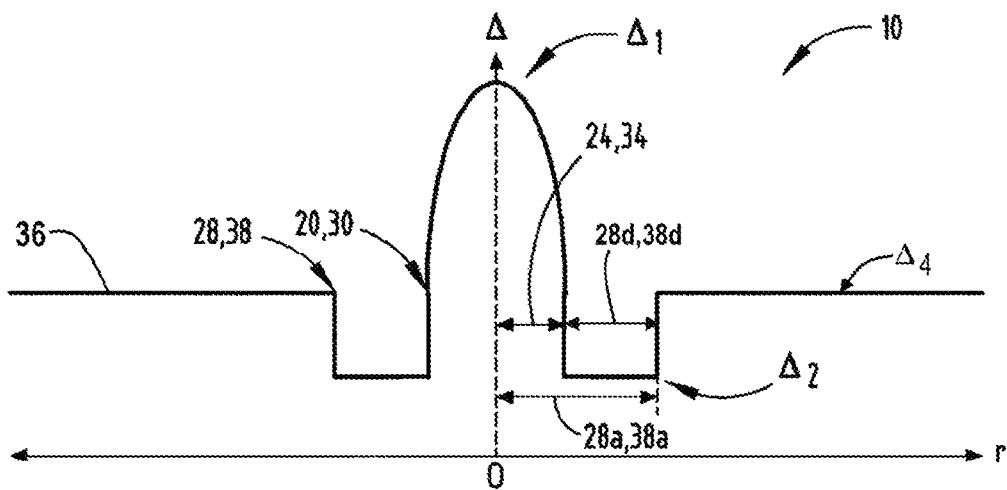
FIG. 6 depicts an exemplary α-profile for a core in the multicore glass fiber shown in FIG. 4.

FIG. 6 depicts a relative refractive index profile for cores of a multicore glass fiber having a dedicated inner cladding region and a common outer cladding region as shown, for example, in FIG. 4. Relative refractive index profile 10 depicts core regions 20 and 30 with radius $r_1$ depicted at 24 and 34, dedicated inner cladding regions 28 and 38 with radius $r_2$ depicted at 28a and 38a and thickness depicted at 28d and 38d, and common outer cladding region 36. $\Delta_1$, $\Delta_2$, and $\Delta_4$ are also shown. Core regions 20 and 30 each have a graded-index relative refractive index profile.

Figure 7:
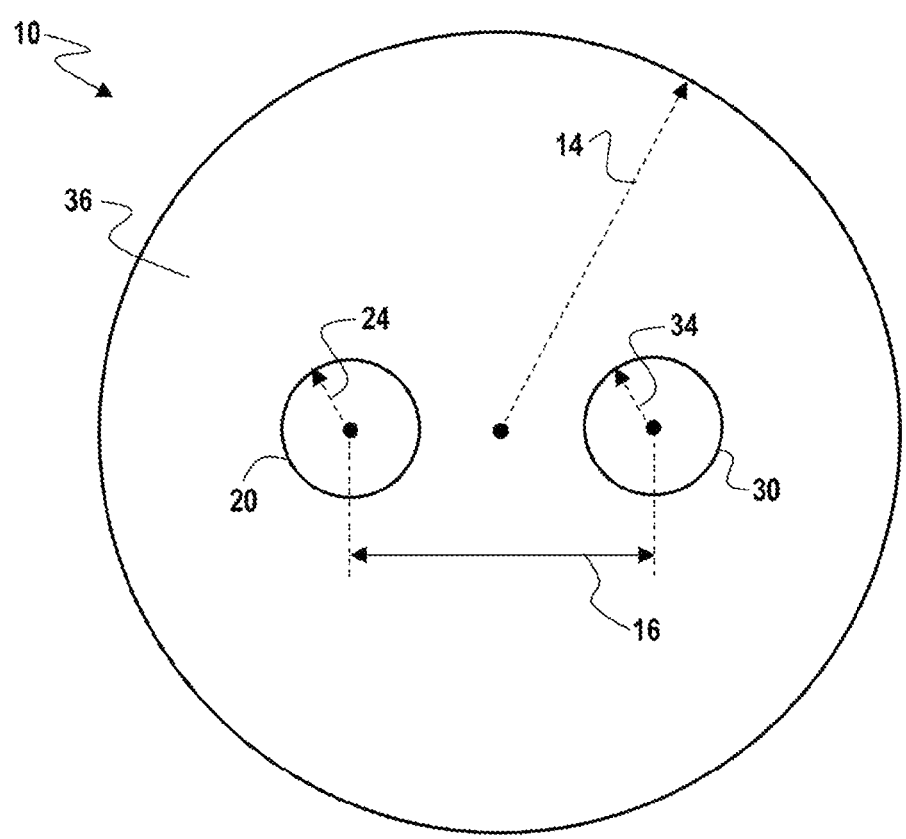
FIG. 7 depicts a cross-section of a multicore glass fiber having two core regions and a common outer cladding region.

FIG. 7 illustrates a multicore glass fiber with two cores. In each core, a core region is directly adjacent to a common outer cladding region. A first core includes core region 20 and common outer cladding 36. Core region 20 has an outer radius $r_1$ depicted at 24. A second core includes core region 30 common outer cladding 36. Core region 30 has an outer radius $r_1$ depicted at 34. Common outer cladding region 36 has a radius $R_4$ depicted at 14 and the spacing between the centerlines of core regions 20 and 30 is depicted at 16.

Figure 8:
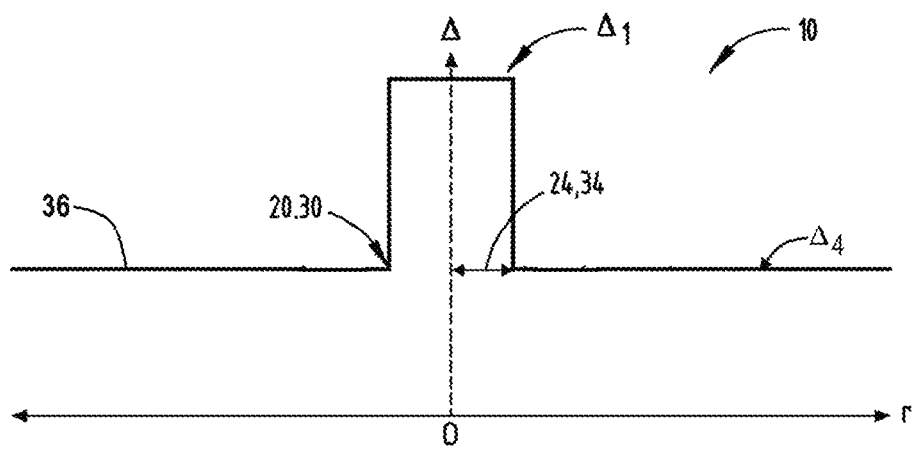
FIG. 8 depicts an exemplary step-index profile for a core in the multicore glass fiber shown in FIG. 7.

FIG. 8 depicts a relative refractive index profile for cores of a multicore glass fiber having a common outer cladding region as shown, for example, in FIG. 7. Relative refractive index profile 10 depicts core regions 20 and 30 with radius $r_1$ depicted at 24 and 34 and common outer cladding region 36. $\Delta_1$, $\Delta_2$, and $\Delta_4$ are also shown. Core regions 20 and 30 each have a step-index relative refractive index profile.

Figure 9:
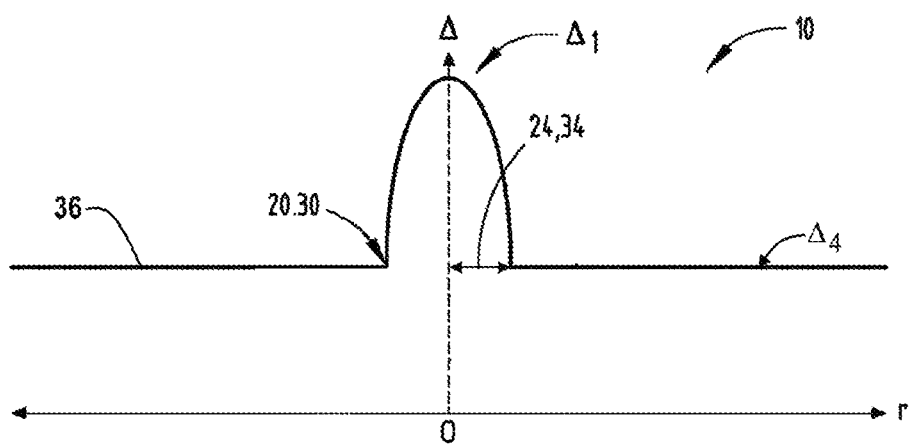
FIG. 9 depicts an exemplary step-index profile for a core in the multicore glass fiber shown in FIG. 7.

FIG. 9 depicts a relative refractive index profile for cores of a multicore glass fiber having a common outer cladding region as shown, for example, in FIG. 7. Relative refractive index profile 10 depicts core regions 20 and 30 with radius $r_1$ depicted at 24 and 34 and common outer cladding region 36. $\Delta_1$, $\Delta_2$, and $\Delta_4$ are also shown. Core regions 20 and 30 each have a graded-index relative refractive index profile.

Although the relative refractive index profiles shown in FIGS. 2 and 3 are illustrated to be the same for both cores of the multicore glass fiber shown in FIG. 1, the relative refractive index profiles shown in FIGS. 5 and 6 are shown to be the same for both cores of the multicore glass fiber shown in FIG. 4 and the relative refractive index profiles shown in FIGS. 8 and 9 are shown to be the same for both cores of the multicore glass fiber shown in FIG. 7, it is understood that the disclosure extends to embodiments in which different cores of a multicore glass fiber have different relative refractive index profiles. In one embodiment, both cores have a step-index relative refractive index profile, but differ in one or more of $\Delta_1$, $\Delta_2$, $\Delta_3$, $r_1$, $r_2$, and $r_3$. In another embodiment, both cores have an α-profile relative refractive index profile (or other graded-index relative refractive index profile), but differ in one or more of α, $\Delta_1$, $\Delta_2$, $\Delta_3$, $r_1$, $r_2$, and $r_3$. Differences in α, $\Delta_1$, $\Delta_2$, and $\Delta_3$ are achievable through differences in composition, dopant concentration, spatial distribution of dopant, and/or dopant type. Differences in $r_1$, $r_2$, and $r_3$ are achievable by controlling the thicknesses of regions in a preform corresponding to the core region, inner cladding region, and/or depressed index cladding region. In some embodiments, the multicore glass fiber includes a core with a step-index relative refractive index profile and a core with a graded-index (e.g. α-profile) relative refractive index profile.

Figure 10:
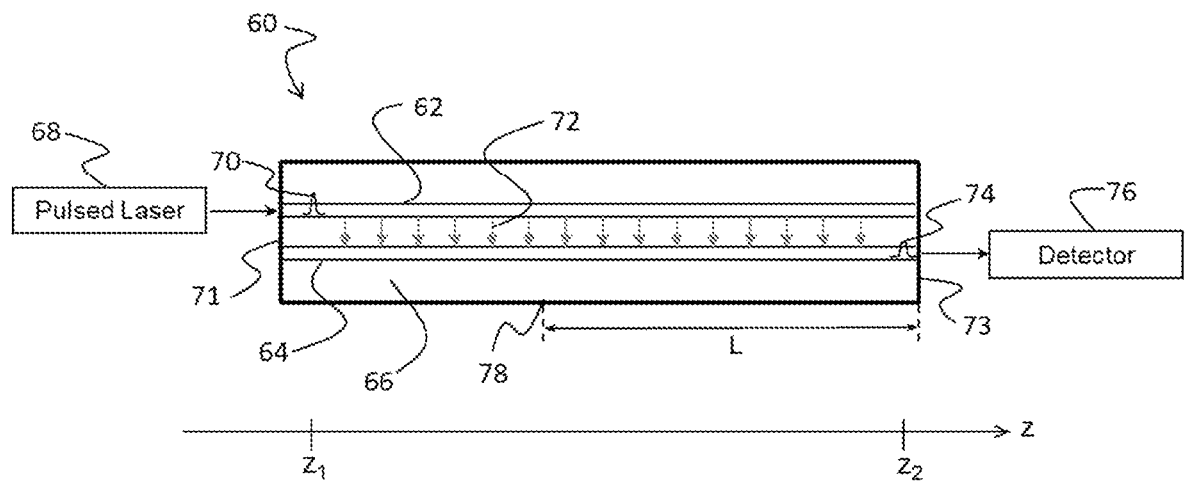
FIG. 10 depicts crosstalk in a multicore glass fiber.

The relative refractive index profiles of the core regions and cladding regions, and the spacing between centerlines of the cores of the multicore optical fiber are selected to enable crosstalk between cores. As used herein, crosstalk refers to transfer of optical signal intensity from one core to another core. Crosstalk is facilitated by overlap of the evanescent field of an optical signal in one core with a cladding region or core region of another core. Crosstalk is also facilitated by overlap of the evanescent field of an optical signal in one core with the evanescent field of an optical signal in another core in a cladding region between the two cores. Crosstalk is schematically depicted in FIG. 10, which shows multicore glass fiber 60 having cores 62 and 64. Cores 62 and 64 include embodiments having any of the core regions and dedicated cladding regions described herein (details not shown in FIG. 10). Cores 62 and 64 are surrounded by common outer cladding 66. Pulsed laser 68 launches probe signal 70 into core 62 at input end 71 of multicore glass fiber 60. As probe signal 70 propagates along core 62, crosstalk occurs and a portion of probe signal 70 is transferred to core 64. The transfer of optical signal is depicted as transfer signal 72 and leads to production of crosstalk signal 74 in core 64. Crosstalk signal 74 is detected by detector 76 at output end 73 of multicore glass fiber 60. A portion of probe signal 70 remains in core 62, which means that the crosstalk signal 74 detected by detector 76 has lower power than the power of probe signal 70 when initially launched in core 62. It is recognized that back crosstalk from core 64 to core 62 may occur so that transfer signal 72 corresponds to the net transfer of optical signal from core 62 to core 64 in the crosstalk process.

In one embodiment, sensing is accomplished by monitoring the power of the crosstalk signal. The power of the crosstalk signal is sensitive to external perturbations in the environment surrounding the multicore optical fiber or the condition of the multicore optical fiber. External perturbations include changes in temperature and changes in strain that occur when the multicore optical fiber is subjected to an external force. In the absence of an external perturbation, the crosstalk signal has a baseline amplitude. In the presence of an external perturbation, the crosstalk signal deviates from the baseline amplitude. The deviation in power correlates to the magnitude of the external perturbation. A precise relationship between the power deviation and magnitude of external perturbation can be obtained from calibrations obtained from experiments under controlled conditions.

In another embodiment, sensing is accomplished by configuring cores of the multicore glass fiber to differ in group delay and monitoring the time delay between the crosstalk signal and the probe signal at a common detection position along the z-direction. Sensing in this embodiment provides information about the spatial position of a localized external perturbation relative to the detection position. The group velocity $v_g$ of a pulsed optical signal is given by:

$$v_g = \frac{d\beta}{d\omega} \qquad (1)$$

where $\omega$ is the angular frequency and $\beta$ is the propagation constant. The group delay $\tau$ is given by $$\tau = \frac{L}{v_g} \qquad (2)$$

and normalized group delay $\tau'$ is given by $$\tau' = \frac{\tau}{L} = \frac{1}{v_g} \qquad (3)$$

where L is the distance traveled by the optical signal in the direction of propagation from the point of the localized perturbation to the point of detection. For purposes of the present disclosure, group velocity, group delay and normalized group delay are reported for a wavelength of 1550 nm.

In FIG. 10, a perturbation occurs at perturbation point 78 located at a distance L from output end 73 of multicore glass fiber. To determine the distance L, detection of probe signal 70 of core 62 and crosstalk signal 74 of core 64 occurs at output end 73. Detection includes determination of the time at which detection of probe signal 70 and crosstalk signal 74 occurs relative to the time of launch of probe signal 70. The distance L is determined from:

$$L = \frac{(t_1 - t_2)}{(\tau'_1 - \tau'_2)} \qquad (4)$$

where $t_1$ and $\tau'_1$ are the detection time and normalized group delay of probe signal 70 in core 62 and $t_2$ and $\tau'_2$ are the detection time and normalized group delay of crosstalk signal 74 in core 64.

As is known in the art, differences in group velocity in the cores of a multicore optical fiber can be achieved by configuring the cores to differ in relative refractive index profile (e.g. differences in values of $\Delta$ or radial position for one or more of the core and/or cladding regions).

The power or time delay of the crosstalk signal provides a basis for sensing. To improve sensitivity of sensing, it is preferably to configure the multicore optical fiber to provide a high degree of crosstalk between cores. The degree of crosstalk is a measure of the power of the crosstalk signal relative to the power of the probe signal. As used herein, degree of crosstalk is normalized to the distance traversed by the crosstalk signal and the probe signal in the direction of propagation of the optical signal (see Eq. (5) below). Degree of crosstalk is expressed herein in units of dB/km.

By way of example, the direction of propagation of probe signal 70 and crosstalk signal 74 shown in FIG. 10 is the z-direction. The z-direction is parallel to the centerlines of cores 62 and 64 and is oriented in the direction from the input (launch end) to the output (detection end) of the multicore glass fiber. At each z location over a distance of $\Delta z$, crosstalk occurs through transfer of a portion of probe signal 70 from core 62 to core 64 to provide crosstalk signal 74. The crosstalk is depicted as transfer signal 72. If the power of crosstalk signal 74 is $P_2$ at location $z > z_1$ and the power of probe signal 70 at location $z_1$ is $P_1$, the degree of crosstalk at location z in a linear scale is given as:

$$\text{Degree of Crosstalk}(z) = \frac{P_2/P_1}{z - z_1} \qquad (5)$$

and the degree of crosstalk in a logarithmic scale is given as:

$$\text{Degree of Crosstalk }(z)(\text{in dB}) = 10\log\left(\frac{P_2/P_1}{z - z_1}\right) \qquad (6)$$

Note that the power of crosstalk signal 74 increases linearly with the distance z only in the linear scale (Eq. (5)) and not in the logarithmic scale (Eq. (6)). For convenience, we use the logarithmic scale and express the degree of crosstalk as dB/km herein. If, for example, the power $P_2$ of crosstalk signal 74 is 0.5% of the power $P_1$ of the probe signal 70 for a 1 km separation ($z-z_1$) between crosstalk signal 74 and probe signal 70, the degree of crosstalk is −26 dB/km. If we apply this degree of crosstalk to a 1 m long fiber segment, the crosstalk is −23 dB/m.

Since determination of the point of an external perturbation along the multicore optical fiber requires detection of probe signal 70 (see Eq. (4)), the degree of crosstalk (or propagation distance in the z-direction) must not be so high as to preclude detection of probe signal 70. For purposes of the present sensor, the degree of crosstalk between two cores of the multicore optical fiber is greater than −30 dB/km, or greater than −25 dB/km, or greater than −20 dB/km, or greater than −15 dB/km, or greater than −10 dB/km, or in the range from −30 dB/km to −1 dB/km, or in the range from −25 dB/km to −2 dB/km, or in the range from −20 dB/km to −3 dB/km, or in the range from −17 dB/km to −4 dB/km, or in the range from −15 dB/km to −5 dB/km.

To achieve high spatial resolution in the detection of the position of the perturbation point of a localized perturbation, it is preferably to configure the cores of the multicore optical fiber to have a large difference in normalized group delay $\tau'$. In some embodiments, a difference $\tau'_1 - \tau'_2$ in the normalized group delay of the optical signal and the crosstalk signal is greater than 1 ns/km, or greater than 3 ns/km, or greater than 5 ns/km, or greater than 7 ns/km or in the range from 1 ns/km-10 ns/km, or in the range from 2 ns/km-8 ns/km, or in the range from 3 ns/km-6 ns/km. In some embodiments, a magnitude (absolute value) of the difference $\tau'_1 - \tau'_2$ in the normalized group delay of the optical signal and the crosstalk signal is greater than 1 ns/km, or greater than 3 ns/km, or greater than 5 ns/km, or greater than 7 ns/km or in the range from 1 ns/km-10 ns/km, or in the range from 2 ns/km-8 ns/km, or in the range from 3 ns/km-6 ns/km.

Configurations of cores in the multicore glass fiber that achieve the degree of crosstalk and normalized group delay difference needed for sensing are now described. Relevant considerations in the configuration of cores include relative refractive indices ($\Delta_1$, $\Delta_2$, $\Delta_3$, $\Delta_4$, and minimum and maximum values of each), radial positions of core and cladding regions ($r_1$, $r_2$, $r_3$, and $R_4$), and separation between the centerlines of the cores involved in crosstalk.

The relative ordering of relative refractive indices in the relative refractive index profile shown in FIGS. 2 and 3 satisfy the conditions $\Delta_1$ (or $\Delta_{1max}$)>$\Delta_4$>$\Delta_3$ (or $\Delta_{3min}$) and $\Delta_1$ (or $\Delta_{1max}$)>$\Delta_2$>$\Delta_3$ (or $\Delta_{3min}$). The values of $\Delta_2$ and $\Delta_4$ may be equal or either may be greater than the other, but both $\Delta_2$ and $\Delta_4$ are between $\Delta_1$ (or $\Delta_{1max}$) and $\Delta_3$ (or $\Delta_{3min}$). The relative ordering of relative refractive indices $\Delta_1$, $\Delta_3$, and $\Delta_4$ in the relative refractive index profiles shown in FIGS. 5 and 6 satisfy the conditions $\Delta_1$ (or $\Delta_{1max}$)>$\Delta_4$>$\Delta_2$ (or $\Delta_{2min}$).

Each of the two or more core regions of the multicore glass fiber comprises silica glass. The silica glass is undoped silica glass, updoped silica glass, and/or downdoped silica glass. Updoped silica glass includes silica glass doped with one or more of $GeO_2$, an alkali metal oxide (e.g. $Na_2O$, $K_2O$, $Li_2O$, $Cs_2O$, or $Rb_2O$) or a halogen (e.g. Cl, Br). In embodiments, the concentration of $GeO_2$ in silica glass is from 5 wt % to 22 wt %, or 7 wt % to 15 wt %. Downdoped silica glass includes silica glass doped with one or more of F or B. The concentration of $K_2O$ in certain embodiments of the core regions, expressed in terms of the amount of K, is in the range from 20 ppm-1000 ppm, or 35 ppm-500 ppm, or 50 ppm-300 ppm, where ppm refers to parts per million by weight. Alkali metal oxides other than $K_2O$ are present in amounts corresponding to the equivalent molar amount of $K_2O$ as determined from the amount of K indicated above in other embodiments. The concentration of Cl or Br in some embodiments of the core regions is in the range from 0.5 wt %-6.0 wt %, or in the range from 1.0 wt %-5.5 wt %, or in the range from 1.5 wt %-5.0 wt %, or in the range from 2.0 wt %-4.5 wt %, or in the range from 2.5 wt %-4.0 wt %. The dopant type and/or dopant concentration in different core regions of the multicore glass fiber are the same or different.

In some embodiments, at least one core region of the multicore glass fiber includes an updopant and a downdopant, where the concentration of updopant is highest at the centerline (r=0) and lowest at the core radius $r_1$ and the concentration of downdopant is lowest at the centerline (r=0) and highest at the core radius $r_1$. In such embodiments, the relative refractive index $\Delta_1$ can have a positive value near the centerline (r=0) and decrease to a negative value at the core radius $r_1$.

In some embodiments, the relative refractive index of at least one core region of the multicore glass fiber is described by an α-profile with an α value in the range from 1.5-10, or in the range from 1.7-8.0, or in the range from 1.8-6.0, or in the range from 1.9-5.0, or in the range from 2.0-4.0, or in the range 10-50, or in the range from 11-40, or in the range from 12-30. As the value of α increases, the relative refractive profile more closely approaches a step-index profile. For purposes of the present disclosure, index profiles with values of α>10 are regarded as step-index profiles.

In some embodiments, a non-zero group delay difference or non-zero normalized group delay difference for the multicore glass fiber is achieved by including core regions that differ in the value of α. A difference $\alpha_1-\alpha_2$ between core region 1 and core region 2 of a multicore glass fiber is greater than 0.1, or greater than 0.5, or greater than 1.0, or greater than 2.0, or greater than 5.0, or greater than 10.0, or in the range from 0.1-50, or in the range from 1.0-25, or in the range from 2.0-20. A magnitude of a difference $\alpha_1-\alpha_2$ between core region 1 and core region 2 of a multicore glass fiber is greater than 0.1, or greater than 0.5, or greater than 1.0, or greater than 2.0, or greater than 5.0, or greater than 10.0, or in the range from 0.1-50, or in the range from 1.0-25, or in the range from 2.0-20.

For purposes of the present disclosure, the outer radius $r_1$ of each core of the multicore optical fiber is defined as the radial coordinate at which the relative refractive index $\Delta_1$ has decreased from a maximum value $\Delta_{1max}$ to $\Delta_2$. The outer radius $r_1$ of each of the core regions of the multicore glass fiber is in the range from 3.0 μm-9.0 μm, or in the range from 3.0 μm-8.0 μm, or in the range from 3.0 μm-7.0 μm, or in the range from 3.5 μm-6.5 μm.

In some embodiments, a non-zero group delay difference or non-zero normalized group delay difference for the multicore glass fiber is achieved by including core regions that differ in the value of $r_1$. A difference $r_{1,1}-r_{1,2}$ between core region 1 and core region 2 of a multicore glass fiber is greater than 0.1 μm, or greater than 0.2 μm, or greater than 0.3 μm, or greater than 0.5 μm, or greater than 1.0 μm, or in the range from 0.1 μm-3.0 μm, or in the range from 0.2 μm-2.0 μm, or in the range from 0.3 μm-1.0 μm. A magnitude of a difference $r_{1,1}-r_{1,2}$ between core region 1 and core region 2 of a multicore glass fiber is greater than 0.1 μm, or greater than 0.2 μm, or greater than 0.3 μm, or greater than 0.5 μm, or greater than 1.0 μm, or in the range from 0.1 μm-3.0 μm, or in the range from 0.2 μm-2.0 μm, or in the range from 0.3 μm-1.0 μm.

The relative refractive index $\Delta_1$ or $\Delta_{1max}$ of each of the core regions of the multicore glass fiber is in the range from 0.10%-2.0%, or in the range from 0.20%-1.5%, or in the range from 0.30%-1.0%, or in the range from 0.40%-0.80%, or in the range from 0.20%-0.80%, or in the range from 0.30%-0.60%.

A difference $\Delta_{1,1}-\Delta_{1,2}$ between core region 1 and core region 2 of a multicore glass fiber is less than 0.25%, or less than 0.20%, or less than 0.15%, or less than 0.10%, or less than 0.05%, or in the range from 0.01%-0.25%, or in the range from 0.05%-0.25%, or in the range from 0.05%-0.20%. A magnitude of a difference $\Delta_{1,1}-\Delta_{1,2}$ between core region 1 and core region 2 of a multicore glass fiber is less than 0.25%, or less than 0.20%, or less than 0.15%, or less than 0.10%, or less than 0.05%, or in the range from 0.01%-0.25%, or in the range from 0.05%-0.25%, or in the range from 0.05%-0.20%.

A difference $\Delta_{1max,1}-\Delta_{1max,2}$ between core region 1 and core region 2 of a multicore glass fiber is less than 0.25%, or less than 0.20%, or less than 0.15%, or less than 0.10%, or less than 0.05%, or in the range from 0.01%-0.25%, or in the range from 0.05%-0.25%, or in the range from 0.05%-0.20%. A magnitude of a difference $\Delta_{1max,1}-\Delta_{1max,2}$ between core region 1 and core region 2 of a multicore glass fiber is less than 0.25%, or less than 0.20%, or less than 0.15%, or less than 0.10%, or less than 0.05%, or in the range from 0.01%-0.25%, or in the range from 0.05%-0.25%, or in the range from 0.05%-0.20%.

In some embodiments, a non-zero group delay difference or non-zero normalized group delay difference for the multicore glass fiber is facilitated by including core regions that differ in the value of $\Delta_1$ or $\Delta_{1max}$. A difference $\Delta_{1,1}-\Delta_{1,2}$ (or $\Delta_{1max,1}-\Delta_{1max,2}$) between core region 1 and core region 2 of a multicore glass fiber is greater than 0.05%, or greater than 0.10%, or greater than 0.15%, or greater than 0.20%, or in the range from 0.05%-1.0%, or in the range from 0.10%-0.50%, or in the range from 0.15%-0.30%. A magnitude of a difference $\Delta_{1,1}-\Delta_{1,2}$ (or $\Delta_{1max,1}-\Delta_{1max,2}$) between core region 1 and core region 2 of a multicore glass fiber is greater than 0.05%, or greater than 0.10%, or greater than 0.15%, or greater than 0.20%, or in the range from 0.05%-1.0%, or in the range from 0.10%-0.50%, or in the range from 0.15%-0.30%.

In some embodiments, the relative refractive index of at least one of the core regions of the multicore glass fiber is described by a step-index profile having a constant or approximately constant value corresponding to $\Delta_{1max}$.

In embodiments in which a core region of a multicore glass fiber is directly adjacent to a dedicated inner cladding region, the dedicated inner cladding region is comprised of undoped silica glass, updoped silica glass, or downdoped silica glass. Updoped silica glass includes silica glass doped with $GeO_2$, an alkali metal oxide (e.g. $Na_2O$, $K_2O$, $Li_2O$, $Cs_2O$, or $Rb_2O$) or a halogen (e.g. Cl, Br). Downdoped silica glass includes silica glass doped with F or B. If doped with an updopant, the average concentration of updopant in the dedicated inner cladding region is less than the average concentration of updopant in the core region. If doped with a downdopant, the average concentration of downdopant in the dedicated inner cladding region is greater than the average concentration of downdopant in the core region.

A difference in effective index between one core region and another core region is less than $7.0 \times 10^{-4}$, or less than $5.0 \times 10^{-4}$, or less than $2.5 \times 10^{-4}$, or less than $1.0 \times 10^{-4}$, or less than $7.5 \times 10^{-5}$, or less than $5.0 \times 10^{-5}$, or less than $2.5 \times 10^{-5}$, or less than $1.0 \times 10^{-5}$, or less than $7.5 \times 10^{-6}$, or less than $5.0 \times 10^{-6}$, or less than $2.5 \times 10^{-6}$, or less than $1.0 \times 10^{-6}$, or less than $7.5 \times 10^{-7}$, or less than $5.0 \times 10^{-7}$, or in the range from $1.0 \times 10^{-7}$ to $5.0 \times 10^{-4}$, or in the range from $2.5 \times 10^{-7}$ to $1.0 \times 10^{-4}$, or in the range from $5.0 \times 10^{-7}$ to $5.0 \times 10^{-5}$, or in the range from $7.5 \times 10^{-7}$ to $1.0 \times 10^{-5}$.

A magnitude of a difference in effective index between one core region and another core region is less than $7.0 \times 10^{-4}$, or less than $5.0 \times 10^{-4}$, or less than $2.5 \times 10^{-4}$, or less than $1.0 \times 10^{-4}$, or less than $7.5 \times 10^{-5}$, or less than $5.0 \times 10^{-5}$, or less than $2.5 \times 10^{-5}$, or less than $1.0 \times 10^{-5}$, or less than $7.5 \times 10^{-6}$, or less than $5.0 \times 10^{-6}$, or less than $2.5 \times 10^{-6}$, or less than $1.0 \times 10^{-6}$, or less than $7.5 \times 10^{-7}$, or less than $5.0 \times 10^{-7}$, or in the range from $1.0 \times 10^{-7}$ to $5.0 \times 10^{-4}$, or in the range from $2.5 \times 10^{-7}$ to $1.0 \times 10^{-4}$, or in the range from $5.0 \times 10^{-7}$ to $5.0 \times 10^{-5}$, or in the range from $7.5 \times 10^{-7}$ to $1.0 \times 10^{-5}$.

In embodiments in which at least one core region of the multicore glass fiber is directly adjacent to a dedicated inner cladding region, the relative refractive index $\Delta_2$ or $\Delta_{2max}$ or $\Delta_{2min}$ of the dedicated inner cladding region is in the range from $-0.70\%$-$0.20\%$, or in the range from $-0.60\%$-$0.10\%$, or in the range from $-0.50\%$-$0.05\%$, or in the range from $-0.40\%$-$0.00\%$, or in the range from $-0.20\%$-$0.20\%$, or in the range from $-0.10\%$-$0.10\%$, or in the range from $-0.05\%$-$0.05\%$. The relative refractive index $\Delta_2$ is preferably constant or approximately constant. A difference $\Delta_{1max}-\Delta_2$ (or a difference $\Delta_{1max}-\Delta_{2max}$, or a difference $\Delta_{1max,1}-\Delta_{2min}$) is greater than 0.10%, or greater than 0.20%, or greater than 0.30%, or greater than 0.50%, or greater than 0.70%, or greater than 1.0%, or in the range from 0.10%-1.5%, or in the range from 0.20%-1.2%, or in the range from 0.30%-1.0%.

In embodiments in which at least one core region of the multicore glass fiber is directly adjacent to a dedicated inner cladding region, the radius $r_2$ of a dedicated inner cladding region is in the range from 4.0 µm-15.0 µm, or in the range from 4.5 µm-14.0 µm, or in the range from 5.0 µm-13.0 µm, or in the range from 6.0 µm-12.0 µm, or in the range from 7.0 µm-11.0 µm, or in the range from 0.5 µm-7.0 µm, or in the range from 1.0 µm-6.5 µm, or in the range from 1.5 µm-6.0 µm, or in the range from 2.0 µm-5.5 µm. The thickness $r_2-r_1$ of the inner cladding region is in the range from 0.1 µm-10.0 µm, or in the range from 0.5 µm-8.0 µm, or in the range from 1.0 µm-6.0 µm.

In embodiments in which at least one core region of the multicore glass fiber is directly adjacent to a dedicated inner cladding region, the value of $\Delta_2$ (or $\Delta_{2max}$) for dedicated inner cladding regions of different core regions is the same or different. In some embodiments, a non-zero group delay difference or non-zero normalized group delay difference for the multicore glass fiber is achieved by including dedicated inner cladding regions that differ in the value of $\Delta_2$ or $\Delta_{2max}$. A difference $\Delta_{2,1}-\Delta_{2,2}$ (or a difference $\Delta_{2max,1}-\Delta_{2max,2}$) between dedicated inner cladding region 1 and dedicated inner cladding region 2 of a multicore glass fiber is greater than 0.05%, or greater than 0.10%, or greater than 0.15%, or greater than 0.20%, or in the range from 0.05%-1.0%, or in the range from 0.10%-0.50% µm, or in the range from 0.15%-0.30%. A magnitude of a difference $\Delta_{2,1}-\Delta_{2,2}$ (or a magnitude of a difference $\Delta_{2max,1}-\Delta_{2max,2}$) between dedicated inner cladding region 1 and dedicated inner cladding region 2 of a multicore glass fiber is greater than 0.05%, or greater than 0.10%, or greater than 0.15%, or greater than 0.20%, or in the range from 0.05%-1.0%, or in the range from 0.10%-0.50% µm, or in the range from 0.15%-0.30%.

In embodiments in which at least one core region of the multicore glass fiber is directly adjacent to a dedicated inner cladding region, the value of $r_2$ for dedicated inner cladding regions of different core regions is the same or different. In some embodiments, a non-zero group delay difference or non-zero normalized group delay difference for the multicore glass fiber is achieved by including dedicated inner cladding regions that differ in the value of $r_2$. A difference $r_{2,1}-r_{2,2}$ between dedicated inner cladding region 1 and dedicated inner cladding region 2 of a multicore glass fiber is greater than 0.5 µm, or greater than 1.0 µm, or greater than 2.0 µm, or greater than 3.0 µm, or in the range from 1.0 µm-8.0 µm, or in the range from 2.0 µm-7.5 µm, or in the range from 3.0 µm-7.0 µm. A magnitude of a difference $r_{2,1}-r_{2,2}$ between dedicated inner cladding region 1 and dedicated inner cladding region 2 of a multicore glass fiber is greater than 0.5 µm, or greater than 1.0 µm, or greater than 2.0 µm, or greater than 3.0 µm, or in the range from 1.0 µm-8.0 µm, or in the range from 2.0 µm-7.5 µm, or in the range from 3.0 µm-7.0 µm.

In embodiments in which at least one core region of the multicore glass fiber is directly adjacent to a dedicated inner cladding region that is adjacent to a dedicated depressed index cladding region, the dedicated depressed index cladding region comprises downdoped silica glass. The preferred downdopant is F. The concentration of F is in the range from 0.1 wt %-2.5 wt %, or in the range from 0.25 wt %-2.25 wt %, or in the range from 0.3 wt %-2.0 wt %.

In embodiments in which at least one core region is directly adjacent to a dedicated inner cladding region that is directly adjacent to a dedicated depressed index cladding region, the relative refractive index $\Delta_3$ or $\Delta_{3min}$ is in the range from −0.1% to −0.8%, or in the range from −0.2% to −0.7%, or in the range from −0.3% to −0.6%. The relative refractive index $\Delta_3$ is preferably constant or approximately constant. A difference $\Delta_{1max}-\Delta_3$ (or a difference $\Delta_{1max}-\Delta_{3min}$, or a difference $\Delta_1-\Delta_3$, or a difference $\Delta_1-\Delta_{3min}$) is greater than 0.30%, or greater than 0.50%, or greater than 0.80%, or greater than 1.0%, or in the range from 0.30%-2.0%, or in the range from 0.40%-1.7%, or in the range from 0.50%-1.4%. A difference $\Delta_2-\Delta_3$ (or a difference $\Delta_2-\Delta_{3min}$, or a difference $\Delta_{2max}-\Delta_3$, or a difference $\Delta_{2max}-\Delta_{3min}$) is greater than 0.20%, or greater than 0.35%, or greater than 0.50%, or in the range from 0.20%-0.90%, or in the range from 0.30%-0.80%.

In embodiments in which at least one core region is directly adjacent to a dedicated inner cladding region that is directly adjacent to a dedicated depressed index cladding region, the inner radius of the dedicated depressed index cladding region is $r_2$ and has the values specified above. The outer radius $r_3$ of the dedicated depressed index cladding region is in the range from 7.0 µm-20.0 µm, or in the range from 8.5 µm-18.0 µm, or in the range from 10.0 µm-16.0 µm. The thickness $r_3-r_2$ of the dedicated depressed index cladding region is in the range from 1.0 µm-10.0 µm, or in the range from 1.5 µm-9.0 µm, or in the range from or in the range from 2.0 µm-8.0 µm, or in the range from 3.0 µm-7.0 µm.

In embodiments in which at least one core region of the multicore glass fiber is directly adjacent to a dedicated inner cladding region that is directly adjacent to a dedicated depressed index cladding region, the value of $r_3$ for dedicated depressed index cladding regions of different core regions is the same or different. A difference $r_{3,1}-r_{3,2}$ between dedicated depressed index cladding region 1 and dedicated depressed index cladding region 2 of a multicore glass fiber is greater than 0.1 µm, or greater than 0.5 µm, or greater than 1.0 µm, or greater than 2.0 µm, or greater than 3.0 µm, or greater than 4.0 µm, or greater than 5.0 µm, or in the range from 0.1 µm-9.0 µm, or in the range from 0.5 µm-7.5 µm, or in the range from 1.0 µm-6.0 µm, or in the range from 2.0 µm-9.0 µm, or in the range from 2.5 µm-8.0 µm. A magnitude of a difference $r_{3,1}-r_{3,2}$ between dedicated depressed index cladding region 1 and dedicated depressed index cladding region 2 of a multicore glass fiber is greater than 0.1 µm, or greater than 0.5 µm, or greater than 1.0 µm, or greater than 2.0 µm, or greater than 3.0 µm, or greater than 4.0 µm, or greater than 5.0 µm, or in the range from 0.1 µm-9.0 µm, or in the range from 0.5 µm-7.5 µm, or in the range from 1.0 µm-6.0 µm, or in the range from 2.0 µm-9.0 µm, or in the range from 2.5 µm-8.0 µm.

In embodiments in which at least one core region of the multicore glass fiber is directly adjacent to a dedicated inner cladding region that is directly adjacent to a dedicated depressed index cladding region, the value of $\Delta_3$ (or $\Delta_{3min}$) for dedicated depressed index cladding regions of different core regions is the same or different. A difference $\Delta_{3,1}-\Delta_{3,2}$ (or a difference $\Delta_{3min,1}-\Delta_{3min,2}$) between dedicated depressed index cladding region 1 and dedicated depressed index cladding region 2 of a multicore glass fiber is greater than 0.05%, or greater than 0.10%, or greater than 0.15%, or greater than 0.20%, or in the range from 0.05%-1.0%, or in the range from 0.10%-0.50% µm, or in the range from 0.15%-0.30%. A magnitude of a difference $\Delta_{3,1}-\Delta_{3,2}$ (or a magnitude of a difference $\Delta_{3min,1}-\Delta_{3min,2}$) between dedicated depressed index cladding region 1 and dedicated depressed index cladding region 2 of a multicore glass fiber is greater than 0.05%, or greater than 0.10%, or greater than 0.15%, or greater than 0.20%, or in the range from 0.05%-1.0%, or in the range from 0.10%-0.50% µm, or in the range from 0.15%-0.30%.

In embodiments in which at least one core region is directly adjacent to a dedicated depressed index cladding region, the relative refractive index $\Delta_3$ or $\Delta_{3min}$ is in the range from −0.1% to −0.8%, or in the range from −0.2% to −0.7%, or in the range from −0.3% to −0.6%. The relative refractive index $\Delta_3$ is preferably constant or approximately constant. A difference $\Delta_{1max}-\Delta_3$ (or a difference $\Delta_{1max}-\Delta_{3min}$, or a difference $\Delta_1-\Delta_3$, or a difference $\Delta_1-\Delta_{3min}$) is greater than 0.30%, or greater than 0.50%, or greater than 0.80%, or greater than 1.0%, or in the range from 0.30%-2.0%, or in the range from 0.40%-1.7%, or in the range from 0.50%-1.4%.

In embodiments in which at least one core region is directly adjacent to a dedicated depressed index cladding region, the inner radius of the dedicated depressed index cladding region is $r_1$ and has the values specified above. The outer radius $r_3$ of the dedicated depressed index cladding region is in the range from 7.0 µm-20.0 µm, or in the range from 8.5 µm-18.0 µm, or in the range from 10.0 µm-16.0 µm. A thickness $r_3-r_1$ of the dedicated depressed index cladding region is in the range from 1.0 µm-10.0 µm, or in the range from 1.5 µm-9.0 µm, or in the range from or in the range from 2.0 µm-8.0 µm, or in the range from 3.0 µm-7.0 µm.

In embodiments in which at least one core region of the multicore glass fiber is directly adjacent to a dedicated depressed index cladding region, the value of $r_3$ for dedicated depressed index cladding regions of different core regions is the same or different. A difference $r_{3,1}-r_{3,2}$ between dedicated depressed index cladding region 1 and dedicated depressed index cladding region 2 of a multicore glass fiber is greater than 0.1 µm, or greater than 0.2 µm, or greater than 0.3 µm, or greater than 0.5 µm, or in the range from 0.1 µm-2.0 µm, or in the range from 0.2 µm-1.0 µm, or in the range from 0.3 µm-0.6 µm. A magnitude of a difference $r_{3,1}-r_{3,2}$ between dedicated depressed index cladding region 1 and dedicated depressed index cladding region 2 of a multicore glass fiber is greater than 0.1 µm, or greater than 0.2 µm, or greater than 0.3 µm, or greater than 0.5 µm, or in the range from 0.1 µm-2.0 µm, or in the range from 0.2 µm-1.0 µm, or in the range from 0.3 µm-0.6 µm.

In embodiments in which at least one core region of the multicore glass fiber is directly adjacent to a dedicated depressed index cladding region, the value of $\Delta_3$ (or $\Delta_{3min}$) for dedicated depressed index cladding regions of different core regions is the same or different. A difference $\Delta_{3,1}-\Delta_{3,2}$ (or a difference $\Delta_{3min,1}-\Delta_{3min,2}$) between dedicated depressed index cladding region 1 and dedicated depressed index cladding region 2 of a multicore glass fiber is greater than 0.05%, or greater than 0.10%, or greater than 0.15%, or greater than 0.20%, or in the range from 0.05%-1.0%, or in the range from 0.10%-0.50% µm, or in the range from 0.15%-0.30%. A magnitude of a difference $\Delta_{3,1}-\Delta_{3,2}$ (or a magnitude of a difference $\Delta_{3min,1}-\Delta_{3min,2}$) between dedicated depressed index cladding region 1 and dedicated depressed index cladding region 2 of a multicore glass fiber is greater than 0.05%, or greater than 0.10%, or greater than 0.15%, or greater than 0.20%, or in the range from 0.05%-1.0%, or in the range from 0.10%-0.50% μm, or in the range from 0.15%-0.30%.

In embodiments in which a common outer cladding region is directly adjacent (a) two or more dedicated depressed index cladding regions, each associated with a different core region, (b) two or more dedicated inner cladding regions, each associated with a different core region, (c) a dedicated inner cladding region associated with one core region and a dedicated depressed index cladding region associated with a different core region, or (d) two or more core regions, the relative refractive index $\Delta_4$ or $\Delta_{4max}$ of the common outer cladding region is in the range from −0.30%-0.30%, or in the range from −0.20%-0.20%, or in the range from −0.10%-0.10%, or in the range from −0.05%-0.05%. The relative refractive index $\Delta_4$ is preferably constant or approximately constant. A difference $\Delta_4-\Delta_3$ (or a difference $\Delta_4-\Delta_{3min}$, or a difference $\Delta_{4max}-\Delta_3$, or a difference $\Delta_{4max}-\Delta_{3min}$) is greater than 0.10%, or greater than 0.20%, or greater than 0.30%, or greater than 0.50%, or in the range from 0.10%-0.80%, or in the range from 0.20%-0.70%.

In embodiments in which a common outer cladding region is directly adjacent (a) two or more dedicated depressed index cladding regions, each associated with a different core region, (b) two or more dedicated inner cladding regions, each associated with a different core region, (c) a dedicated inner cladding region associated with one core region and a dedicated depressed index cladding region associated with a different core region, or (d) two or more core regions, the outer radius $R_4$ is less than 100.0 μm, or less than 80.0 μm, or less than 65.0 μm, or less than 62.5 μm, or less than 60.0 μm, or less than 55.0 μm, or in the range from 50.0 μm-100.0 μm, or in the range from 55.0 μm-90.0 μm, or in the range from 57.5 μm-80.0 μm, or in the range from 60.0 μm-70.0 μm. The thickness $R_4-r_2$ (in embodiments in which the common outer cladding region is directly adjacent to an inner cladding region that is directly adjacent to a core region), or $R_4-r_3$ (in embodiments in which the outer cladding region is directly adjacent to a dedicated depressed index cladding region that is directly adjacent to a dedicated inner cladding region that is directly adjacent to a core region) of the outer cladding region is in the range from 20.0 μm-80.0 μm, or in the range from 25.0 μm-70.0 μm, or in the range from 30.0 μm-60.0 μm.

A mode field diameter MFD of at least one core region (in combinations with its cladding regions) of the multicore glass fiber is greater than 7.0 μm, or greater than 8.0 μm, or greater than 9.0 μm, or greater than 10.0 μm, or in the range from 7.0 μm-12.0 μm, or in the range from 7.5 μm-11.0 μm, or in the range from 8.0 μm-10.5 μm at a wavelength of 1550 nm.

An effective area $A_{eff}$ of at least one core region (in combinations with its cladding regions) of the multicore glass fiber is greater than 50 μm², or greater than 60 μm², or greater than 70 μm², or greater than 80 μm², or in the range from 50 μm²-100 μm², or in the range from 55 μm²-95 μm², or in the range from 60 μm²-90 μm², or in the range from 65 μm²-85 μm² at a wavelength of 1550 nm.

A spacing between the centerlines of at least two of the core regions of the multicore glass fiber is less than 45 μm, or less than 40 μm, or less than 35 μm, or less than 30 μm, or less than 25 μm, or less than 20 μm, or less than 15 μm, or in the range from 10 μm-45 μm, or in the range from 10 μm-40 μm, or in the range from 10 μm-35 μm, or in the range from 12 μm-28 μm, or in the range from 15 μm-25 μm.

In one embodiment, a coating is applied to the outer surface of a common outer cladding region. The coatings are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition or as a coating. The cured product is preferably a polymer. The curing process is induced by energy. Forms of energy include electromagnetic radiation or thermal energy.

A curable component includes one or more curable functional groups. A curable component with only one curable functional group is referred to herein as a monofunctional curable component. A curable component having two or more curable functional groups is referred to herein as a multifunctional curable component. Multifunctional curable components can introduce crosslinks into the polymeric network that forms during the curing process. Multifunctional curable components may also be referred to herein as "crosslinkers" or "curable crosslinkers". Curable components include curable monomers and curable oligomers. Examples of functional groups that participate in covalent bond formation during the curing process are acrylate groups and methacrylate groups.

The coating preferably includes a primary coating surrounding and directly adjacent to a common outer cladding region and a secondary coating surrounding and directly adjacent to the primary coating. The secondary coating is a harder material (higher Young's modulus) than the primary coating and is designed to protect the multicore glass fiber from damage caused by abrasion or external forces that arise during processing, handling, and installation of the multicore optical fiber. The primary coating is a softer material (lower Young's modulus) than the secondary coating and is designed to buffer or dissipates stresses that result from forces applied to the outer surface of the secondary coating. Dissipation of stresses within the primary coating attenuates the stress and minimizes the stress that reaches the multicore glass fiber. The primary coating is especially important in dissipating stresses that arise when the multicore optical fiber is bent. The multicore optical fiber may also include a tertiary coating that surrounds and is directly adjacent to the secondary coating. The tertiary coating may include pigments, inks or other coloring agents to mark the optical fiber for identification purposes and typically has a Young's modulus similar to the Young's modulus of the secondary coating.

Primary and secondary coatings are typically formed on the draw by applying a curable coating composition to the multicore glass fiber as a viscous liquid and curing. In a continuous optical fiber manufacturing process, a glass fiber is drawn from a heated preform and sized to a target diameter. The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

The primary coating is a cured product of a radiation-curable primary coating composition that includes an oligomer, a monomer, a photoinitiator and, optionally, an additive.

The oligomer preferably includes a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups. The di-adduct compound is a diacrylate compound formed by reaction of both isocyanate groups of the diisocyanate compound with the hydroxy acrylate compound.

The one or more monomers is/are selected to be compatible with the oligomer, to control the viscosity of the primary coating composition to facilitate processing, and/or to influence the physical or chemical properties of the coating formed as the cured product of the primary coating composition. The monomers include radiation-curable monomers such as ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—CH$_2$—CH$_2$—), n-propoxylene (—O—CH$_2$—CH$_2$—CH$_2$—), iso-propoxylene (—O—CH$_2$—CH(CH$_3$)—, or —O—CH(CH$_3$)—CH$_2$—), etc. In some embodiments, the primary coating composition includes an alkoxylated monomer of the form R$_4$—R$_5$—O—(CH(CH$_3$)CH$_2$—O)$_q$—C(O)CH=CH$_2$, where R$_4$ and R$_5$ are aliphatic, aromatic, or a mixture of both, and q=1 to 10, or R$_4$—O—(CH(CH$_3$)CH$_2$—O)$_q$—C(O)CH=CH$_2$, where C(O) is a carbonyl group, R$_1$ is aliphatic or aromatic, and q=1 to 10.

Representative examples of monofunctional monomers include ethylenically unsaturated monomers such as lauryl acrylate, ethoxylated nonylphenol acrylate, caprolactone acrylate, phenoxyethyl acrylate, isooctyl acrylate, tridecyl acrylate, isobornyl acrylate, tetrahydrofurfuryl acrylate, stearyl acrylate, isodecyl acrylate, 2-(2-ethoxyethoxy)ethyl acrylate, epoxy acrylate, lauryloxyglycidyl acrylate and phenoxyglycidyl acrylate and combinations thereof. Examples of multifunctional monomers include dipentaerythritol monohydroxy pentaacrylate, methylolpropane polyacrylates with and without alkoxylation such as trimethylolpropane triacrylate and ditrimethylolpropane tetraacrylate, alkoxylated glyceryl triacrylates such as propoxylated glyceryl triacrylate with propoxylation being 3 or greater, and erythritol polyacrylates with and without alkoxylation, such as pentaerythritol tetraacrylate, ethoxylated pentaerythritol tetraacrylate, dipentaerythritol pentaacrylate, tripropyleneglycol diacrylate, propoxylated hexanediol diacrylate, tetrapropyleneglycol diacrylate, pentapropyleneglycol diacrylate, methacrylate analogs of the foregoing, and combinations thereof. Other monomers include N-vinyl amide monomers such as an N-vinyl lactam, or N-vinyl pyrrolidinone, or N-vinyl caprolactam.

The photoinitiator facilitates initiation of the polymerization process associated with the curing of the primary coating composition to form the coating. Photoinitiators include ketonic photoinitiators and/or phosphine oxide photoinitiators. When used in the curing of the coating composition, the photoinitiator is present in an amount sufficient to enable rapid radiation curing. Representative photoinitiators include 1-hydroxycyclohexylphenyl ketone; bis(2,6-dimethoxybenzoyl)-2,4,4-trimethylpentylphosphine oxide; 2,2-dimethoxy-2-phenylacetophenone; bis(2,4,6-trimethylbenzoyl)-phenylphosphine oxide; (2,4,6-trimethylbenzoyl) diphenyl phosphine oxide; ethoxy(2,4,6-trimethylbenzoyl)-phenylphosphine oxide; and combinations thereof.

The curable primary coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the primary coating composition (e.g., protect against de-polymerization or oxidative degradation.

The secondary coating is a cured product of a curable secondary coating composition that includes a monomer, a photoinitiator, an optional oligomer, and an optional additive.

The monomers preferably include ethylenically unsaturated compounds. The one or more monomers may be present in an amount of 50 wt % or greater, or in an amount from about 60 wt % to about 99 wt %, or in an amount from about 75 wt % to about 99 wt %, or in an amount from about 80 wt % to about 99 wt % or in an amount from about 85 wt % to about 99 wt %. In one embodiment, the secondary coating is the radiation-cured product of a secondary coating composition that contains urethane acrylate monomers.

Exemplary monofunctional ethylenically unsaturated monomers for the curable secondary coating composition include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate, and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate, tetrahydrofurfuryl acrylate, caprolactone acrylate, and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate; acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Representative radiation-curable ethylenically unsaturated monomers for the curable secondary composition include alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—), etc.

Representative multifunctional ethylenically unsaturated monomers for the curable secondary coating composition include, without limitation, alkoxylated bisphenol A diacrylates, such as ethoxylated bisphenol A diacrylate, with the degree of alkoxylation being 2 or greater. The monomer component of the secondary coating composition may include ethoxylated bisphenol A diacrylate with a degree of ethoxylation ranging from 2 to about 30, or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30; propoxylated-trimethylolpropane triacrylate with the degree of propoxylation being 3 or greater; for example, ranging from 3 to 30; ditrimethylolpropane tetraacrylate; alkoxylated glyceryl triacrylates such as propoxylated glyceryl triacrylate with the degree of propoxylation being 3 or greater; erythritol polyacrylates with and without alkoxylation, such as pentaerythritol tetraacrylate, ethoxylated pentaerythritol tetraacrylate, and dipentaerythritol pentaacrylate; isocyanurate polyacrylates formed by reacting an appropriate functional isocyanurate with an acrylic acid or acryloyl chloride, such as tris-(2-hydroxyethyl) isocyanurate triacrylate and tris-(2-hydroxyethyl) isocyanurate diacrylate; alcohol polyacrylates with and without alkoxylation such as tricyclodecane dimethanol diacrylate and ethoxylated polyethylene glycol diacrylate with the degree of ethoxylation being 2 or greater; for example, ranging from about 2 to 30; epoxy acrylates formed by adding acrylate to bisphenol A diglycidylether and the like; and single and multi-ring cyclic aromatic or non-aromatic polyacrylates such as dicyclopentadiene diacrylate and dicyclopentane diacrylate.

The optional oligomer present in the radiation-curable secondary coating composition is preferably a compound with urethane linkages. In one aspect, the optional oligomer is a reaction product of a polyol compound, a diisocyanate compound, and a hydroxy-functional acrylate compound. Reaction of the polyol compound with the diisocyanate compound provides a urethane linkage and the hydroxy-functional acrylate compound reacts with isocyanate groups to provide terminal acrylate groups.

The curable secondary coating composition also includes a photoinitiator and optionally includes additives such as an anti-oxidant, an optical brightener, an amine synergist, a tackifier, a catalyst, a carrier or surfactant, and a stabilizer as described above in connection with the curable primary coating composition.

EXAMPLES

Model Designs. The following examples illustrate five designs of multicore glass fibers suitable for use as crosstalk sensors. The designs are labeled Examples 1-5. Each multicore fiber includes two core regions. Each core of Examples 1 and 2 is as depicted in FIG. 7 and includes a core region with a step-index relative refractive index profile (α-profile with α=20) and a common outer cladding region directly adjacent the core region. Each core of Example 3 is as depicted in FIG. 7 and includes a core region with a graded-index relative refractive index profile (α-profile with α=2) and a common outer cladding region directly adjacent the core region. Each core of Examples 4 and 5 is as depicted in FIG. 1 and includes a core region, a dedicated inner cladding region directly adjacent to the core region, a dedicated depressed index cladding region directly adjacent to the dedicated inner cladding region, and a common outer cladding region directly adjacent to the dedicated depressed index cladding region. Both core regions of Examples 4 and 5 have step-index relative refractive index profiles (α-profile with α=200). The relative refractive index profile of each core of Examples 1 and 2 is of the type shown in FIG. 8. The relative refractive index profile of each core of Example 3 is of the type shown in FIG. 9. The relative refractive index profiles of each core of Examples 4 and 5 are of the type shown in FIG. 2. One or more parameters of the relative refractive index profiles differ for the two core regions and/or associated dedicated cladding regions in each of Examples 1-5. Parameters of the relative refractive index profile for Examples 1-5 are summarized in Table 1 below. Core spacing refers to the distance between the centerlines of the two cores.

TABLE 1

Relative Refractive Index Profiles

| | Example 1 Core | | Example 2 Core | | Example 3 Core | | Example 4 Core | | Example 5 Core | |
|---|---|---|---|---|---|---|---|---|---|---|
| | 1 | 2 | 1 | 2 | 1 | 2 | 1 | 2 | 1 | 2 |
| Core Spacing | 30 µm | | 20 µm | | 30 µm | | 25 µm | | 15 µm | |
| $\Delta_{1\ max}$ (%) | 0.34 | 0.40 | 0.40 | 0.50 | 0.41 | 0.55 | 0.34 | 0.46 | 0.34 | 0.55 |
| $r_1$ (µm) | 5.0 | 4.1 | 4.7 | 3.6 | 6.6 | 4.6 | 4.3 | 3.2 | 5.1 | 3.0 |
| $\alpha$ | 20 | 20 | 20 | 20 | 2.0 | 2.0 | 200 | 200 | 200 | 200 |
| $\Delta_2$ (%) | | | | | | | 0.0 | 0.0 | 0.0 | 0.0 |
| $r_2$ (µm) | | | | | | | 9.5 | 7.0 | 11.3 | 6.6 |
| $\Delta_3$ (%) | | | | | | | −0.50 | −0.40 | −0.40 | −0.30 |
| $r_3$ (µm) | | | | | | | 13.1 | 9.7 | 15.5 | 9.0 |
| $\Delta_4$ (%) | 0.0 | 0.0 | 0.0 | 0.0 | 0.0 | 0.0 | 0.0 | 0.0 | 0.0 | 0.0 |

Selected optical parameters of each core of each of Examples 1-5 are summarized in Table 2. $\lambda_c$ refers to the 2-meter cutoff wavelength of the core. MFD refers to the mode field diameter of the core at 1550 nm. $A_{eff}$ refers to the effective area of the core at 1550 nm. $|\tau'_1-\tau'_2|$ is the magnitude of the normalized group delay difference of the two cores at 1550 nm. Effective index difference $|n_{eff1}-n_{eff2}|$ refers to the magnitude of the difference between the effective index of core 1 and the effective index of core 2 at 1550 nm.

TABLE 2

Optical Parameters

| | Example 1 Core | | Example 2 Core | | Example 3 Core | | Example 4 Core | | Example 5 Core | |
|---|---|---|---|---|---|---|---|---|---|---|
| | 1 | 2 | 1 | 2 | 1 | 2 | 1 | 2 | 1 | 2 |
| $\lambda_c$ (nm) | 1486 | 1316 | 1526 | 1294 | 1536 | 1244 | 1283 | 1096 | 1549 | 1143 |
| MFD (µm) | 10.6 | 9.5 | 9.9 | 8.5 | 10.7 | 8.9 | 10.1 | 8.3 | 10.7 | 7.8 |
| $A_{eff}$ (µm) | 88.7 | 69.6 | 77.0 | 55.2 | 86.4 | 58.9 | 79.4 | 52.8 | 93.0 | 46.0 |
| Dispersion (ps/nm/km) | 18.7 | 15.9 | 18.6 | 14.0 | 18.2 | 13.1 | 19.3 | 15.8 | 20.0 | 13.9 |
| $|\tau'_1 - \tau'_2|$ (ns/km) | 2.4 | | 4.1 | | 4.4 | | 5.2 | | 8.9 | |
| $|n_{eff1} - n_{eff2}|$ | $5.6 \times 10^{-6}$ | | $2.7 \times 10^{-7}$ | | $1.5 \times 10^{-6}$ | | $1.1 \times 10^{-6}$ | | $5.6 \times 10^{-6}$ | |

Figure 11:
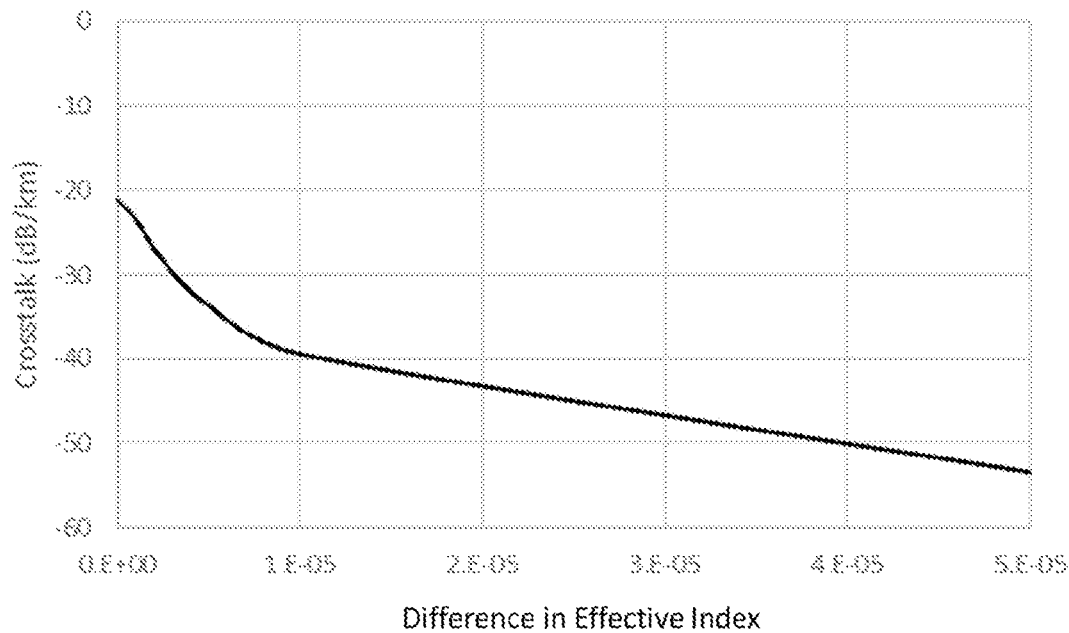
FIG. 11 depicts the degree of crosstalk as a function of the difference in effective index of two cores coupled in a crosstalk process.

FIG. 11 depicts the degree of crosstalk for two cores as a function of the difference between the effective indices of the two cores. In the phase-matched condition (no difference in the effective indices of the two cores), the relative refractive index profile of the example depicted in FIG. 11 is configured such that the degree of crosstalk is about −21 dB/km. The crosstalk decreases with an increasing difference in effective index as the departure from the phase-matched condition increases. When the difference in effective index is $5 \times 10^{-6}$, the degree of crosstalk has decreased by about 12 dB/km, when the difference in effective index is $2 \times 10^{-5}$, the degree of crosstalk has decreased by about 20 dB/km and when the difference effective index is $5 \times 10^{-5}$, degree of crosstalk has decreased by about 30 dB/km. For fiber sensors based on crosstalk as the sensing mechanism, it is desirable to reduce the phase mismatch to increase the crosstalk level. It is accordingly preferred to minimize the difference between the effective indices of cores involved in the crosstalk process.

Clause 1 of the present disclosure extends to:
A multicore optical fiber comprising:
a multicore glass fiber, the multicore glass fiber comprising:
a first core region surrounded by and directly adjacent to a first dedicated cladding region, the first core region having a first effective index;
a second core region surrounded by and directly adjacent to a second dedicated cladding region, the second core region having a second effective index; and
a third cladding region common to the first core and the second core, the third cladding region being directly adjacent to the first dedicated cladding region and the second dedicated cladding region;
wherein a degree of crosstalk between the first core region and the second core region is greater than −30 dB/km, a magnitude of a normalized group delay difference between the first core region and the second core region is greater than 1 ns/km and a magnitude of a difference between the first effective index and the second effective index is less than $7.0 \times 10^{-4}$.

Clause 2 of the present disclosure extends to:
The multicore optical fiber of clause 1, wherein the first core region has a radius $r_{1,1}$ in the range from 3.0 µm-8.0 µm and the second core region has a radius $r_{1,2}$ in the range from 3.0 µm-8.0 µm.

Clause 3 of the present disclosure extends to:
The multicore optical fiber of clause 2, wherein a magnitude of a difference $r_{1,1}-r_{1,2}$ is greater than 0.5 µm.

Clause 4 of the present disclosure extends to:
The multicore optical fiber of clause 1, wherein the first core region has a radius $r_{1,1}$ in the range from 3.5 µm-6.5 µm and the second core region has a radius $r_{1,2}$ in the range from 3.5 μm-6.5 μm.

Clause 5 of the present disclosure extends to:

The multicore optical fiber of any of clauses 1-4, where in the first core region has a relative refractive index $\Delta_{1max,1}$ in the range from 0.20%-0.80% and the second core region has a relative refractive index $\Delta_{1max,2}$ in the range from 0.20%-0.80%.

Clause 6 of the present disclosure extends to:

The multicore optical fiber of clause 5, wherein a magnitude of a difference $\Delta_{1max,1}-\Delta_{1max,2}$ is greater than 0.10%.

Clause 7 of the present disclosure extends to:

The multicore optical fiber of any of clauses 1-6, wherein the first dedicated cladding region has a radius $r_{3,1}$ in the range from 7.0 μm-20.0 μm and the second dedicated cladding region has a radius $r_{3,2}$ in the range from 7.0 μm-20.0 μm.

Clause 8 of the present disclosure extends to:

The multicore optical fiber of clause 7, wherein a magnitude of a difference $r_{3,1}-r_{3,2}$ is greater than 2.0 μm.

Clause 9 of the present disclosure extends to:

The multicore optical fiber of any of clauses 1-6, wherein the first dedicated cladding region has a radius $r_{3,1}$ in the range from 8.5 μm-18.0 μm and the second dedicated cladding region has a radius $r_{3,2}$ in the range from 8.5 μm-18.0 μm.

Clause 10 of the present disclosure extends to:

The multicore optical fiber of any of clauses 1-9, where in the first dedicated cladding region has a relative refractive index $\Delta_{3,1}$ in the range from −0.20% to −0.70% and the second dedicated cladding region has a relative refractive index $\Delta_{3,2}$ in the range from −0.20% to −0.70%.

Clause 11 of the present disclosure extends to:

The multicore optical fiber of clause 10, wherein a magnitude of a difference $\Delta_{3,1}-\Delta_{3,2}$ is greater than 0.10%.

Clause 12 of the present disclosure extends to:

The multicore optical fiber of any of clauses 1-6, wherein the first dedicated cladding region includes a first dedicated inner cladding region directly adjacent to a first dedicated depressed index cladding region and the second dedicated cladding region includes a second dedicated inner cladding region directly adjacent to a second dedicated depressed index cladding region.

Clause 13 of the present disclosure extends to:

The multicore optical fiber of clause 12, wherein the first dedicated inner cladding has a radius $r_{2,1}$ in the range from 4.0 μm-15.0 μm and the second dedicated inner cladding has a radius $r_{2,2}$ in the range from 4.0 μm-15.0 μm.

Clause 14 of the present disclosure extends to:

The multicore optical fiber of clause 13, wherein a magnitude of a difference $r_{2,1}-r_{2,2}$ is greater than 2.0 μm.

Clause 15 of the present disclosure extends to:

The multicore optical fiber of clause 13, wherein the first dedicated depressed index cladding region surrounds the first dedicated inner cladding region and the second dedicated depressed index cladding region surrounds the second dedicated inner cladding region, and wherein the first dedicated depressed index cladding region has a radius $r_{3,1}$ in the range from 7.0 μm-20.0 μm and the second dedicated depressed index cladding region has a radius $r_{3,2}$ in the range from 7.0 μm-20.0 μm.

Clause 16 of the present disclosure extends to:

The multicore optical fiber of clause 15, wherein a magnitude of a difference $r_{3,1}-r_{3,2}$ is greater than 2.0 μm.

Clause 17 of the present disclosure extends to:

The multicore optical fiber of clause 15 or 16, wherein the first dedicated depressed index cladding region has a relative refractive index $\Delta_{3min,1}$ in the range from −0.20% to −0.70% and the second dedicated cladding region has a relative refractive index $\Delta_{3min,2}$ in the range from −0.20% to −0.70%.

Clause 18 of the present disclosure extends to:

The multicore optical fiber of clause 17, wherein a magnitude of a difference $\Delta_{3min,1}-\Delta_{3min,2}$ is greater than 0.10%.

Clause 19 of the present disclosure extends to:

The multicore optical fiber of any of clauses 1-18, wherein the third cladding region has a radius $R_4$ less than 65 μm.

Clause 20 of the present disclosure extends to:

The multicore optical fiber of any of clauses 1-19, wherein the degree of crosstalk is greater than −25 dB/km.

Clause 21 of the present disclosure extends to:

The multicore optical fiber of any of clauses 1-19, wherein the degree of crosstalk is greater than −15 dB/km.

Clause 22 of the present disclosure extends to:

The multicore optical fiber of any of clauses 1-21, wherein the magnitude of the normalized group delay difference between the first core region and the second core region is greater than 5 ns/km.

Clause 23 of the present disclosure extends to:

The multicore optical fiber of any of clauses 1-22, wherein the first core region has a first centerline and the second core region has a second centerline and a spacing between the first centerline and the second centerline is less than 30 μm.

Clause 24 of the present disclosure extends to:

The multicore optical fiber of clause 23, wherein the spacing between the first centerline and the second centerline is less than 20 μm.

Clause 25 of the present disclosure extends to:

The multicore optical fiber of any of clauses 1-24, further comprising a coating surrounding and directly adjacent to the third cladding region, the coating comprising a polymer.

Clause 26 of the present disclosure extends to:

A multicore optical fiber comprising:
a multicore glass fiber, the multicore glass fiber comprising:
a first core region surrounded by and directly adjacent to a first dedicated cladding region, the first core region having a first effective index;
a second core region surrounded by and directly adjacent to a second dedicated cladding region, the second core region having a second effective index; and
a third cladding region common to the first core and the second core, the third cladding region being directly adjacent to the first dedicated cladding region and the second dedicated cladding region;
wherein a degree of crosstalk between the first core region and the second core region is greater than −20 dB/km and a magnitude of a difference between the first effective index and the second effective index is less than $7.0\times10^{-4}$.

Clause 27 of the present disclosure extends to:

The multicore optical fiber of clause 26, wherein the first core region has a radius $r_{1,1}$ in the range from 3.0 μm-8.0 μm and the second core region has a radius $r_{1,2}$ in the range from 3.0 μm-8.0 μm.

Clause 28 of the present disclosure extends to:

The multicore optical fiber of clause 27, wherein a magnitude of a difference $r_{1,1}-r_{1,2}$ is greater than 0.5 μm.

Clause 29 of the present disclosure extends to:

The multicore optical fiber of clause 26, wherein the first core region has a radius $r_{1,1}$ in the range from 3.5 μm-6.5 μm and the second core region has a radius $r_{1,2}$ in the range from 3.5 μm-6.5 μm.

Clause 30 of the present disclosure extends to:

The multicore optical fiber of any of clauses 26-29, where in the first core region has a relative refractive index $\Delta_{1max,1}$ in the range from 0.20%-0.80% and the second core region has a relative refractive index $\Delta_{1max,2}$ in the range from 0.20%-0.80%.

Clause 31 of the present disclosure extends to:

The multicore optical fiber of clause 30, wherein a magnitude of a difference $\Delta_{1max,1}-\Delta_{1max,2}$ is greater than 0.10%.

Clause 32 of the present disclosure extends to:

The multicore optical fiber of any of clauses 26-31, wherein the first dedicated cladding region has a radius $r_{3,1}$ in the range from 7.0 μm-20.0 μm and the second dedicated cladding region has a radius $r_{3,2}$ in the range from 7.0 μm-20.0 μm.

Clause 33 of the present disclosure extends to:

The multicore optical fiber of clause 32, wherein a magnitude of a difference $r_{3,1}-r_{3,2}$ is greater than 2.0 μm.

Clause 34 of the present disclosure extends to:

The multicore optical fiber of any of clauses 26-31, wherein the first dedicated cladding region has a radius $r_{3,1}$ in the range from 8.5 μm-18.0 μm and the second dedicated cladding region has a radius $r_{3,2}$ in the range from 8.5 μm-18.0 μm.

Clause 35 of the present disclosure extends to:

The multicore optical fiber of any of clauses 26-34, where in the first dedicated cladding region has a relative refractive index $\Delta_{3,1}$ in the range from −0.20% to −0.70% and the second dedicated cladding region has a relative refractive index $\Delta_{3,2}$ in the range from −0.20% to −0.70%.

Clause 36 of the present disclosure extends to:

The multicore optical fiber of clause 35, wherein a magnitude of a difference $\Delta_{3,1}-\Delta_{3,2}$ is greater than 0.10%.

Clause 37 of the present disclosure extends to:

The multicore optical fiber of any of clauses 26-31, wherein the first dedicated cladding region includes a first dedicated inner cladding region directly adjacent to a first dedicated depressed index cladding region and the second dedicated region includes a second dedicated inner cladding region directly adjacent to a second dedicated depressed index cladding region.

Clause 38 of the present disclosure extends to:

The multicore optical fiber of clause 37, wherein the first dedicated inner cladding has a radius $r_{2,1}$ in the range from 4.0 μm-15.0 μm and the second dedicated inner cladding has a radius $r_{2,2}$ in the range from 4.0 μm-15.0 μm.

Clause 39 of the present disclosure extends to:

The multicore optical fiber of clause 38, wherein a magnitude of a difference $r_{2,1}-r_{2,2}$ is greater than 2.0 μm.

Clause 40 of the present disclosure extends to:

The multicore optical fiber of clause 38 or 39, wherein the first dedicated depressed index cladding region surrounds the first dedicated inner cladding region and the second dedicated depressed index cladding region surrounds the second dedicated inner cladding region, and wherein the first dedicated depressed index cladding region has a radius $r_{3,1}$ in the range from 7.0 μm-20.0 μm and the second dedicated depressed index cladding region has a radius $r_{3,2}$ in the range from 7.0 μm-20.0 μm.

Clause 41 of the present disclosure extends to:

The multicore optical fiber of clause 40, wherein a magnitude of a difference $r_{3,1}-r_{3,2}$ is greater than 2.0 μm.

Clause 42 of the present disclosure extends to:

The multicore optical fiber of clause 40 or 41, wherein the first dedicated depressed index cladding region has a relative refractive index $\Delta_{3min,1}$ in the range from −0.20% to −0.70% and the second dedicated cladding region has a relative refractive index $\Delta_{3min,2}$ in the range from −0.20% to −0.70%.

Clause 43 of the present disclosure extends to:

The multicore optical fiber of clause 42, wherein a magnitude of a difference $\Delta_{3min,1}-\Delta_{3min,2}$ is greater than 0.10%.

Clause 44 of the present disclosure extends to:

The multicore optical fiber of any of clauses 26-43, wherein the third cladding region has a radius $R_4$ less than 65 μm.

Clause 45 of the present disclosure extends to:

The multicore optical fiber of any of clauses 26-44, wherein the degree of crosstalk is greater than −10 dB/km.

Clause 46 of the present disclosure extends to:

The multicore optical fiber of any of clauses 26-45, wherein the magnitude of the normalized group delay difference between the first core region and the second core region is greater than 1 ns/km.

Clause 47 of the present disclosure extends to:

The multicore optical fiber of any of clauses 26-45, wherein the magnitude of the normalized group delay difference between the first core region and the second core region is greater than 5 ns/km.

Clause 48 of the present disclosure extends to:

The multicore optical fiber of any of clauses 26-47, further comprising a coating surrounding and directly adjacent to the third cladding region, the coating comprising a polymer.

Clause 49 of the present disclosure extends to:

The multicore optical fiber of any of clauses 26-48, wherein the first core region has a first centerline and the second core region has a second centerline and a spacing between the first centerline and the second centerline is less than 30 μm.

Clause 50 of the present disclosure extends to:

The multicore optical fiber of clause 49, wherein the spacing between the first centerline and the second centerline is less than 20 μm.

Clause 51 of the present disclosure extends to:

A method of sensing comprising:

launching an optical signal into a first end of a first core region of a multicore optical fiber, the first core region having a first effective index; and detecting a crosstalk signal from the optical signal at a second end of a second core region of the multicore optical fiber, the second core region having a second effective index, a magnitude of a difference between the first effective index and the second effective index being less than $7.0 \times 10^{-4}$; and determining a temperature or a change in temperature from the crosstalk signal.

Clause 52 of the present disclosure extends to:

The method of clause 51, further comprising detecting the optical signal at a second end of the first core region.

Clause 53 of the present disclosure extends to:

The method of clause 51 or 52, further comprising determining a normalized group delay $\tau'_1$ of the optical signal and a normalized group delay $\tau'_2$ of the crosstalk signal.

Clause 54 of the present disclosure extends to:

The method of any of clauses 51-53, further comprising determining a distance between the second end of the second core region and a perturbation point along a length of the multicore optical fiber, the perturbation point corresponding to a position of the temperature or the change in temperature.

Clause 55 of the present disclosure extends to:
A method of sensing comprising:
launching an optical signal into a first end of a first core region of a multicore optical fiber, the first core region having a first effective index; and
detecting a crosstalk signal from the optical signal at a second end of a second core region of the multicore optical fiber, the second core region having a second effective index, a magnitude of a difference between the first effective index and the second effective index being less than $7.0 \times 10^{-4}$; and
determining a strain or a change in strain from the crosstalk signal.

Clause 56 of the present disclosure extends to:
The method of clause 55, further comprising detecting the optical signal at a second end of the first core region.

Clause 57 of the present disclosure extends to:
The method of clause 55 or 56, further comprising determining a normalized group delay $\tau'_1$ of the optical signal and a normalized group delay $\tau'_2$ of the crosstalk signal.

Clause 58 of the present disclosure extends to:
The method of any of clauses 55-57, further comprising determining a distance between the second end of the second core region and a perturbation point along a length of the multicore optical fiber, the perturbation point corresponding to a position of the temperature or the change in temperature.

Clause 59 of the present disclosure extends to:
A sensing system comprising:
a multicore optical fiber, the multicore optical fiber comprising:
a multicore glass fiber, the multicore glass fiber comprising:
a first core region surrounded by and directly adjacent to a first dedicated cladding region, the first core region having a first effective index;
a second core region surrounded by and directly adjacent to a second dedicated cladding region, the second core region having a second effective index; and
a third cladding region common to the first core and the second core, the third cladding region being directly adjacent to the first dedicated cladding region and the second dedicated cladding region;
wherein a degree of crosstalk between the first core region and the second core region is greater than −30 dB/km, a magnitude of a normalized group delay difference between the first core region and the second core region is greater than 1 ns/km and a magnitude of a difference between the first effective index and the second effective index is less than $7.0 \times 10^{-4}$; and
a light source operably coupled to the first core region.

Clause 60 of the present disclosure extends to:
The sensing system of clause 59, further comprising;
a detector operably coupled to the second core region.

Clause 61 of the present disclosure extends to:
A multicore optical fiber comprising:
a multicore glass fiber, the multicore glass fiber comprising:
a first core region, the first core region having a first effective index;
a second core region, the second core region having a second effective index; and
a third cladding region common to the first core and the second core, the third cladding region being directly adjacent to the first core region and the second core region;
wherein a degree of crosstalk between the first core region and the second core region is greater than −30 dB/km, a magnitude of a normalized group delay difference between the first core region and the second core region is greater than 1 ns/km, and a magnitude of a difference between the first effective index and the second effective index is less than $7.0 \times 10^{-4}$.

Clause 62 of the present disclosure extends to:
The multicore optical fiber of clause 61, wherein the first core region has a radius $r_{1,1}$ in the range from 3.0 µm-8.0 µm and the second core region has a radius $r_{1,2}$ in the range from 3.0 µm-8.0 µm.

Clause 63 of the present disclosure extends to:
The multicore optical fiber of clause 62, wherein a magnitude of a difference $r_{1,1}-r_{1,2}$ is greater than 0.5 µm.

Clause 64 of the present disclosure extends to:
The multicore optical fiber of any of clauses 61-63, wherein the first core region has a radius in the range from 3.5 µm-6.5 µm and the second core region has a radius $r_{1,2}$ in the range from 3.5 µm-6.5 µm.

Clause 65 of the present disclosure extends to:
The multicore optical fiber of any of clauses 61-64, wherein the first core region has a relative refractive index $\Delta_{1max,1}$ in the range from 0.20%-0.80% and the second core region has a relative refractive index $\Delta_{1max,2}$ in the range from 0.20%-0.80%.

Clause 66 of the present disclosure extends to:
The multicore optical fiber of clause 65, wherein a magnitude of a difference $\Delta_{1max,1}-\Delta_{1max,2}$ is greater than 0.10%.

Clause 67 of the present disclosure extends to:
The multicore optical fiber of any of clauses 61-66, wherein the third cladding region has a radius $R_4$ less than 65 µm.

Clause 68 of the present disclosure extends to:
The multicore optical fiber of any of clauses 61-67, wherein the degree of crosstalk is greater than −25 dB/km.

Clause 69 of the present disclosure extends to:
The multicore optical fiber of any of clauses 61-67, wherein the degree of crosstalk is greater than −15 dB/km.

Clause 70 of the present disclosure extends to:
The multicore optical fiber of any of clauses 61-69, wherein the magnitude of the normalized group delay difference between the first core region and the second core region is greater than 5 ns/km.

Clause 71 of the present disclosure extends to:
The multicore optical fiber of any of clauses 61-70, wherein the first core region has a first centerline and the second core region has a second centerline and a spacing between the first centerline and the second centerline is less than 30 µm.

Clause 72 of the present disclosure extends to:
The multicore optical fiber of clause 71, wherein the spacing between the first centerline and the second centerline is less than 20 µm.

Clause 73 of the present disclosure extends to:
The multicore optical fiber of any of clauses 61-72, further comprising a coating surrounding and directly adjacent to the third cladding region, the coating comprising a polymer.

Clause 74 of the present disclosure extends to:
The multicore optical fiber of any of clauses 1-73, wherein the magnitude of the difference between the first effective index and the second effective index is less than $1.0 \times 10^{-4}$.

Clause 75 of the present disclosure extends to:
The multicore optical fiber of any of clauses 1-73, wherein the difference between the first effective index and the second effective index is less than $1.0 \times 10^{-5}$.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A multicore optical fiber comprising:
    a multicore glass fiber, the multicore glass fiber comprising:
        a first core region surrounded by and directly adjacent to a first dedicated cladding region, the first core region having a first effective index;
        a second core region surrounded by and directly adjacent to a second dedicated cladding region, the second core region having a second effective index; and
        a third cladding region common to the first core and the second core, the third cladding region being directly adjacent to the first dedicated cladding region and the second dedicated cladding region;
    wherein a degree of crosstalk between the first core region and the second core region is greater than −30 dB/km, a magnitude of a normalized group delay difference between the first core region and the second core region is greater than 1 ns/km, and a magnitude of a difference between the first effective index and the second effective index is less than $7.0 \times 10^{-4}$.

2. The multicore optical fiber of claim 1, wherein the first core region has a radius $r_{1,1}$ in the range from 3.0 μm-8.0 μm and the second core region has a radius $r_{1,2}$ in the range from 3.0 μm-8.0 μm.

3. The multicore optical fiber of claim 2, wherein a magnitude of a difference $r_{1,1}$-$r_{1,2}$ is greater than 0.5 μm.

4. The multicore optical fiber of claim 1, wherein the first core region has a relative refractive index $\Delta_{1max,1}$ in the range from 0.20%-0.80% and the second core region has a relative refractive index $\Delta_{1max,2}$ in the range from 0.20%-0.80%.

5. The multicore optical fiber of claim 4, wherein a magnitude of a difference $\Delta_{1max,1}$-$\Delta_{1max,2}$ is greater than 0.10%.

6. The multicore optical fiber of claim 1, wherein the first dedicated cladding region has a radius $r_{3,1}$ in the range from 7.0 μm-20.0 μm and the second dedicated cladding region has a radius $r_{3,2}$ in the range from 7.0 μm-20.0 μm.

7. The multicore optical fiber of claim 6, wherein a magnitude of a difference $r_{3,1}$-$r_{3,2}$ is greater than 2.0 μm.

8. The multicore optical fiber of claim 1, where in the first dedicated cladding region has a relative refractive index $\Delta_{3,1}$ in the range from −0.20% to −0.70% and the second dedicated cladding region has a relative refractive index $\Delta_{3,2}$ in the range from −0.20% to −0.70%.

9. The multicore optical fiber of claim 1, wherein the first dedicated cladding region includes a first dedicated inner cladding region directly adjacent to a first dedicated depressed index cladding region and the second dedicated cladding region includes a second dedicated inner cladding region directly adjacent to a second dedicated depressed index cladding region.

10. The multicore optical fiber of claim 9, wherein the first dedicated inner cladding has a radius $r_{2,1}$ in the range from 4.0 μm-15.0 μm and the second dedicated inner cladding has a radius $r_{2,2}$ in the range from 4.0 μm-15.0 μm.

11. The multicore optical fiber of claim 10, wherein a magnitude of a difference $r_{2,1}$-$r_{2,2}$ is greater than 2.0 μm.

12. The multicore optical fiber of claim 10, wherein the first dedicated depressed index cladding region surrounds the first dedicated inner cladding region and the second dedicated depressed index cladding region surrounds the second dedicated inner cladding region, and wherein the first dedicated depressed index cladding region has a radius $r_{3,1}$ in the range from 7.0 μm-20.0 μm and the second dedicated depressed index cladding region has a radius $r_{3,2}$ in the range from 7.0 μm-20.0 μm.

13. The multicore optical fiber of claim 12, wherein a magnitude of a difference $r_{3,1}$-$r_{3,2}$ is greater than 2.0 μm.

14. The multicore optical fiber of claim 12, wherein the first dedicated depressed index cladding region has a relative refractive index $\Delta_{3min,1}$ in the range from −0.20% to −0.70% and the second dedicated cladding region has a relative refractive index $\Delta_{3min,2}$ in the range from −0.20% to −0.70%.

15. The multicore optical fiber of claim 1, wherein the magnitude of the difference between the first effective index and the second effective index is less than $1.0 \times 10^{-5}$.

16. The multicore optical fiber of claim 1, wherein the first core region has a first centerline and the second core region has a second centerline and a spacing between the first centerline and the second centerline is less than 30 μm.

17. The multicore optical fiber of claim 1, wherein the degree of crosstalk is greater than −20 dB/km.

18. The multicore optical fiber of claim 1, wherein a spacing between the centerlines of the first core region and the second core region is less than 40 μm.

19. A multicore optical fiber comprising:
    a multicore glass fiber, the multicore glass fiber comprising:
        a first core region, the first core region having a first effective index;
        a second core region, the second core region having a second effective index; and
        a third cladding region common to the first core and the second core, the third cladding region being directly adjacent to the first core region and the second core region;
    wherein a degree of crosstalk between the first core region and the second core region is greater than −30 dB/km, a magnitude of a normalized group delay difference between the first core region and the second core region is greater than 1 ns/km, and a magnitude of a difference between the first effective index and the second effective index is less than $7.0 \times 10^{-4}$.

20. The multicore optical fiber of claim 19, wherein the first core region has a radius $r_{1,1}$ in the range from 3.0 μm-8.0 μm and the second core region has a radius $r_{1,2}$ in the range from 3.0 μm-8.0 μm.

21. The multicore optical fiber of claim 20, wherein a magnitude of a difference $r_{1,1}$-$r_{1,2}$ is greater than 0.5 μm.

22. The multicore optical fiber of claim 19, wherein the first core region has a relative refractive index $\Delta_{1max,1}$ in the range from 0.20%-0.80% and the second core region has a relative refractive index $\Delta_{1max,2}$ in the range from 0.20%-0.80%.

23. The multicore optical fiber of claim 19, wherein the degree of crosstalk is greater than −15 dB/km.

24. The multicore optical fiber of claim 19, wherein the magnitude of the normalized group delay difference between the first core region and the second core region is greater than 5 ns/km.

25. The multicore optical fiber of claim 19, wherein the magnitude of the difference between the first effective index and the second effective index is less than $1.0 \times 10^{-5}$.

26. The multicore optical fiber of claim 19, wherein the first core region has a first centerline and the second core region has a second centerline and a spacing between the first centerline and the second centerline is less than 30 µm.

27. The multicore optical fiber of claim 19, wherein a spacing between the centerlines of the first core region and the second core region is less than 40 µm.

28. A sensing system comprising:
a multicore optical fiber, the multicore optical fiber comprising:
a multicore glass fiber, the multicore glass fiber comprising:
a first core region surrounded by and directly adjacent to a first dedicated cladding region, the first core region having a first effective index;
a second core region surrounded by and directly adjacent to a second dedicated cladding region, the second core region having a second effective index; and
a third cladding region common to the first core and the second core, the third cladding region being directly adjacent to the first dedicated cladding region and the second dedicated cladding region;
wherein a degree of crosstalk between the first core region and the second core region is greater than −30 dB/km, a magnitude of a normalized group delay difference between the first core region and the second core region is greater than 1 ns/km, and a magnitude of a difference between the first effective index and the second effective index is less than $5.0 \times 10^{-5}$; and
a light source operably coupled to the first core region.

* * * * *

UNITED STATES PATENT AND TRADEMARK OFFICE
CERTIFICATE OF CORRECTION

PATENT NO. : 11,585,684 B2
APPLICATION NO. : 16/999147
DATED : February 21, 2023
INVENTOR(S) : Ming-Jun Li Page 1 of 1

It is certified that error appears in the above-identified patent and that said Letters Patent is hereby corrected as shown below:

On the Title Page

In item (63), in Column 1, Line 2, below "Mar. 4, 2021" insert -- Foreign Application Priority Data
Aug. 26, 2019..............WO PCT/US2019/048132 --, as a new field entry.

Signed and Sealed this
Twenty-fourth Day of September, 2024

Katherine Kelly Vidal
*Director of the United States Patent and Trademark Office*